(12) United States Patent
Chung et al.

(10) Patent No.: US 7,423,535 B2
(45) Date of Patent: Sep. 9, 2008

(54) OBJECT MONITORING, LOCATING, AND TRACKING METHOD EMPLOYING RFID DEVICES

(75) Inventors: Kevin Kwong-Tai Chung, Princeton, NJ (US); Cynthia Ting-Wah Chu, Princeton, NJ (US); Xiaoming Shi, Highland Park, NJ (US); Jing Jian Li, Plainsboro, NJ (US); Ming Zou, Hillsborough, NJ (US)

(73) Assignee: Avante International Technology, Inc., Princeton Junction, NJ (US)

( * ) Notice: Subject to any disclaimer, the term of this patent is extended or adjusted under 35 U.S.C. 154(b) by 308 days.

(21) Appl. No.: 11/198,747

(22) Filed: Aug. 5, 2005

(65) Prior Publication Data

US 2007/0001854 A1    Jan. 4, 2007

Related U.S. Application Data

(60) Provisional application No. 60/672,002, filed on Apr. 15, 2005, provisional application No. 60/663,837, filed on Mar. 21, 2005, provisional application No. 60/660,033, filed on Mar. 9, 2005, provisional application No. 60/657,948, filed on Mar. 2, 2005, provisional application No. 60/628,866, filed on Nov. 15, 2004, provisional application No. 60/607,404, filed on Sep. 3, 2004, provisional application No. 60/605,287, filed on Aug. 26, 2004.

(51) Int. Cl.
    *G08B 13/14* (2006.01)
(52) U.S. Cl. .................. 340/572.4; 340/572.1; 340/10.4

(58) Field of Classification Search .............. 340/572.1, 340/572.3, 572.7, 572.8, 539.1, 545.6, 10.1, 340/10.4, 10.34, 10.42; 370/242, 328, 342; 342/124

See application file for complete search history.

(56) References Cited

U.S. PATENT DOCUMENTS 3,568,161 A    3/1971    Knickel (Continued)

OTHER PUBLICATIONS

INTEL-ORACLE, "Intel, Oracle and Sensor-Based Computing Laying the Technology Foundation for Maximum business Value," prior to Aug. 5, 2005, pp. 1-8.

(Continued)

*Primary Examiner*—Van T. Trieu
(74) *Attorney, Agent, or Firm*—Clement A Berard, Esq; Dann, Dorfman, Herrell & Skillman, PC

(57) ABSTRACT

A method for monitoring a container having an RFID device interior comprises periodically transmitting messages including unique identifying information and receiving messages transmitted by the RFID device interior the container by a receiving device exterior the container. Some messages transmitted when the container is closed are not received by the receiving device, and some messages transmitted when the container is not closed are received. The method comprises storing and/or relaying the received messages and determining from the number of messages received from the RFID device that are stored and/or relayed whether the container has or has not been opened. The method may also comprise transmitting the messages at two or more power levels and selecting messages that are at the lowest power level that produces at least two corresponding stored and/or relayed messages for determining the location of the RFID device.

39 Claims, 7 Drawing Sheets

U.S. PATENT DOCUMENTS

| | | | |
|---|---|---|---|
| 4,352,098 | A | 9/1982 | Stephen et al. |
| 4,818,998 | A | 4/1989 | Apsell et al. |
| 4,998,095 | A | 3/1991 | Shields |
| 5,021,778 | A * | 6/1991 | Walton .................... 340/10.34 |
| 5,058,044 | A | 10/1991 | Stewart et al. |
| 5,119,104 | A | 6/1992 | Heller |
| 5,204,670 | A | 4/1993 | Stinton |
| 5,204,819 | A | 4/1993 | Ryan |
| 5,257,011 | A | 10/1993 | Beigel |
| 5,461,390 | A | 10/1995 | Hoshen |
| 5,483,244 | A | 1/1996 | Grube et al. |
| 5,491,482 | A | 2/1996 | Dingwall et al. |
| 5,512,879 | A | 4/1996 | Stokes |
| 5,528,232 | A | 6/1996 | Verma et al. |
| 5,539,398 | A | 7/1996 | Hall et al. |
| 5,552,789 | A | 9/1996 | Schuermann |
| 5,596,313 | A | 1/1997 | Berglund et al. |
| 5,682,142 | A | 10/1997 | Loosmore et al. |
| 5,686,902 | A | 11/1997 | Reis et al. |
| 5,798,693 | A | 8/1998 | Engellenner |
| 5,883,592 | A | 3/1999 | Schepps et al. |
| 5,887,176 | A | 3/1999 | Griffith et al. |
| 5,914,671 | A | 6/1999 | Tuttle |
| 5,920,261 | A | 7/1999 | Hughes et al. |
| 5,956,259 | A | 9/1999 | Hartsell, Jr. et al. |
| 5,974,368 | A | 10/1999 | Schepps et al. |
| 6,026,868 | A | 2/2000 | Johnson, Jr. |
| 6,040,774 | A | 3/2000 | Schepps |
| 6,075,443 | A | 6/2000 | Schepps et al. |
| 6,100,806 | A | 8/2000 | Gaukel |
| 6,141,610 | A | 10/2000 | Rothert et al. |
| 6,232,877 | B1 | 5/2001 | Ashwin |
| 6,456,239 | B1 | 9/2002 | Werb et al. |
| 6,512,478 | B1 | 1/2003 | Chien |
| 6,549,520 | B1 * | 4/2003 | Gross et al. .................. 370/242 |
| 6,552,661 | B1 | 4/2003 | Lastinger et al. |
| 6,594,370 | B1 | 7/2003 | Anderson |
| 6,657,543 | B1 | 12/2003 | Chung |
| 6,681,990 | B2 | 1/2004 | Vogler et al. |
| 6,700,533 | B1 | 3/2004 | Werb et al. |
| 6,736,316 | B2 | 5/2004 | Neumark |
| 6,738,628 | B1 | 5/2004 | McCall et al. |
| 6,750,771 | B1 | 6/2004 | Brand |
| 6,831,910 | B1 * | 12/2004 | Moon et al. .................. 370/342 |
| 6,834,251 | B1 | 12/2004 | Fletcher |
| 6,928,066 | B1 * | 8/2005 | Moon et al. .................. 370/342 |
| 6,975,228 | B2 | 12/2005 | Wrasman et al. |
| 7,023,340 | B2 * | 4/2006 | Egli et al. ................. 340/545.6 |
| 7,030,761 | B2 | 4/2006 | Bridgelall et al. |
| 7,049,933 | B1 | 5/2006 | Koerner |
| 7,113,125 | B2 * | 9/2006 | Le Sesne .................... 342/124 |
| 7,158,030 | B2 | 1/2007 | Chung |
| 7,176,800 | B2 * | 2/2007 | Sajkowsky .............. 340/572.1 |
| 7,180,403 | B2 | 2/2007 | Quan |
| 7,200,132 | B2 | 4/2007 | Twitchell, Jr. |
| 2002/0126013 | A1 | 9/2002 | Bridgelall |
| 2003/0006878 | A1 | 1/2003 | Chung |
| 2003/0052788 | A1 | 3/2003 | Chung |
| 2003/0209601 | A1 | 11/2003 | Chung |
| 2003/0220711 | A1 | 11/2003 | Allen |
| 2004/0217867 | A1 | 11/2004 | Bridgelall et al. |
| 2006/0055552 | A1 | 3/2006 | Chung et al. |
| 2007/0001854 | A1 | 1/2007 | Chung et al. |
| 2007/0013519 | A1 | 1/2007 | Chung et al. |

OTHER PUBLICATIONS

Unisys Corporation, "Unisys Announces Breakthrough Solutions For Global Visible commerce; Solution Bridges the Gap Between Security and Business Effectiveness," http://www.unisys.com/about_unisys/news_a_events/10058444.htm, prior to Aug. 5, 2005, 3 pages.

Savi Technology, "USA: US custom promotes 'Smartbox' RFID technology for global shippers-says A. T. Kerney," www.savi.com, prior to Aug. 5, 2005, 3 Pages.

Findit Asset Locating, "Effective and reliable systems for tracking valuable assets," Ogdensbury, New York, prior to Aug. 5, 2005, 2 Pages.

AEROSCOUT, AeroScout System Overview Data Sheet, San Meteo, California, prior to Aug. 5, 2005, 4 Pages.

AEROSCOUT, "AeroScout Evaluation & Development Kit Data Sheet," San Meteo, California, prior to Aug. 5, 2005, 2 Pages.

AEROSCOUT, "AeroScout T1 Tag Data Sheet," San Mateo, California, prior to Aug. 5, 2005, 2 pages.

AEROSCOUT, "AeroScout T2 Tag Data Sheet," San Meteo, California, prior to Aug. 5, 2005, 2 pages.

AEROSCOUT, "Supply Chain Visibility Applications Application Note", San Meteo, California, prior to Aug. 5, 2005, 5 Pages.

AEROSCOUT, "Location and Distance-based Applications in Health Care Application Note," San Mateo, California, prior to Aug. 5, 2005, 5 Pages.

AEROSCOUT, "Location-based Wireless LAN Security Application Note," San Mateo, California, prior to Aug. 5, 2005, 4 Pages.

AeroScout, "Child Tracking Application at Legoland Customer Case Study," San Mateo, California, prior to Aug. 5, 2005, 5 Pages.

AEROSCOUT, "Enterprise Visibility Applications in Retail Application Note," San Mateo, California, prior to Aug. 5, 2005, 4 Pages.

EMBER, "Reliable, Secure, Easy-to-Use Embedded Wireless Networking," http://www.ember.com/company/about.html, prior to Aug. 5, 2005, 2 Pages.

WHERENET, "WhereNet Survey Underscores Need For Real-Time Asset Management Solutions," prior to Aug. 5, 2005, 3 Pages.

Chipcon Products from Texas Instruments, "CC1100 Single Chip Low Cost Low Power RF Tranceiver", © 2006, prior to Jun. 25, 2007, 90 pages.

Chipcon Products from Texas Instruments, E. Syvertsen, S. Namtvedt, "Application Note 038, CC1100/CC2500—Wake-on-Radio", © 2005, prior to Jun. 25, 2007, 14 pg.

Chipcon Products from Texas Instruments, Siri Namtvedt, "Application Note AN047, CC1100/CC2500—Wake-on-Radio", © 2006, prior to Jun. 25, 2007, 17 pages.

Chipcon Products from Texas Instruments, Giuseppe Mazzoleni, "Design Note DN400, Interfacing CC1100-CC2500 to the MSP430", © 2006, prior to Jun. 25, 2007, 10 pages.

Chipcon Products from Texas Instruments, Siri Namtvedt, "Design Note DN505, RSSI Interpretation and Timing", © 2006, prior to Jun. 25, 2007, 11 pages.

Chipcon Products from Texas Instruments, "CC2420, 204 Ghz IEEE 802.15.4 / ZigBee-ready RF Transceiver", © 2007, prior to Jun. 25, 2007, 89 pages.

Chipcon Products from Texas Instruments, "ZigBee Wireless Communications Overview", 3Q 2006, © 2006, prior to Jun. 25, 2007, 4 pages.

Nordic Semiconductor, "Product Specification," Single chip 433/868/915 MHz Transceiver nRF905, Jan. 2005, pp. 1-39.

NORDIC VLSI ASA, "Product Specification," Single chip 2.4 GHz Transmitter nRF2402, Aug. 2003, pp. 1-25.

NORDIC VLSI, "Products Overview," http://www.nvlsi.no/index.cfm?ogj=menu&act=displayMenu&men-21, Printed Aug. 18, 2004, 2 Pages.

Intel-Oracle, "Intel, Oracle and Sensor-Based Computing Laying the Technology Foundation for Maximum business Value," pp. 1-8, 2005.

Daily Wireless, "Active RF-ID," http://www.dailywireless.org/modules.php?name=AvantGo&file-print&sid-3930, Printed Apr. 25, 2005, 3 Pages.

Stephanie vL Henkel, "AppSnaps—Application snapshots that show how handy a sensor can be," www.sensorsmag.com, Dated Feb. 2005, 1 Page.

Unisys Corporation, "Unisys Announces Breakthrough Solutions For Global Visible commerce; Solution Bridges the Gap Between Security and Business Effectiveness," http://www.unisys.com/about_unisys/news_a_events/10058444.htm, 3 Pages, Oct. 5, 2004.

Larry Greenemeier, "Step Up In Security," Information Week.com, Printed Oct. 25, 2004, 3 Pages.

Larry Greenemeier, Port Security May Be Aided By Electronic Container Seals, Information Week, http://www.informationweek.com/story/showArticle.jhtml?articleID-47205231, Dated Sep. 14, 2004, 2 Pages.

Larry Greenemeier, "Supply-Chain Security Will Take More Than RFID," Information Week, http://www.informationweek.com/story/showArticle.jhtml?articleID-49400889, Dated Oct. 5, 2004, 2 Pages.

Savi Technology, "USA: US custom promotes 'Smartbox' RFID technology for global shippers-says A. T. Kerney," www.savi.com, 3 Pages, Feb. 11, 2005.

Frontline Solutions, "'Smart' Container Success Will Depend on Government Mandates," Customs Commissioner Outlines Supply Chain Security Plans, Dated Feb. 1, 2005, 3 Pages.

Chel Stromgren, "Report on Electronic Container Seal Technologies," Science Applications International Corporation, McLean, Virginia, Dated Aug. 23, 2002, pp. 1-18.

Michael Wolfe, "Electronic Cargo Seals: Context, Technologies, And Marketplace," North River Consulting Group, Dated Jul. 12, 2002, 46 Pages.

Watchmate Wander Prevention System, "System Overview," http://www.xmarksystems.com/product_pages/wm_main_overview.html, Printed Jun. 23, 2005, 1 page.

Watchmate Wander Prevention System, "WatchMate Models," http://www.xmarksystems.com/product_pages/wm_main_models.html, Printed Jun. 23, 2005, 2 Pages.

Findit Asset Locating System, "Finders Keepers," http://www.xmarksystems.com/product_pages/findit_main.html, Printed Jun. 23, 2005, 1 Page.

Findit Asset Locating, "Effective and reliable systems for tracking valuable assets," Ogdensbury, New York, 2 Pages, Dec. 2003.

AeroScout Enterprise Visibility Solutions, "AeroScout System: Bridging the Gap Between Wi-Fi, Active RFID and GPS," http://www.aeroscout.com/content.asp?page=SystemOverview, Printed Aug. 27, 2004, 3 Pages.

AEROSCOUT, AeroScout System Overview Data Sheet, San Meteo, California, 4 Pages, 2004.

AEROSCOUT, "Software Architecture," http://www.aeroscout.com/content.asp?page=SW_Architecture, Printed Aug. 27, 2004, 1 Page.

AEROSCOUT, "AeroScout Evaluation & Development Kit Data Sheet," San Meteo, California, 2 Pages, 2004.

AEROSCOUT, "Solutions," http://www.aeroscout.com/content.asp?page=Solutions, Printed Aug. 27, 2004, 2 Pages.

AEROSCOUT, "AeroScout T1 Tag Data Sheet," San Mateo, California, 2 Pages, 2004.

AEROSCOUT "AeroScout T2 Tag Data Sheet," San Meteo, Calofornia, 2 pages, 2004.

AEROSCOUT, AeroScout T2 Tag: Reliable Wi-Fi Location in the Palm of Your Hand, http://www.aeroscout.com/content.asp?page=T2Features, Printed Aug. 27, 2004, 2 Pages.

AEROSCOUT, "Logistics Applications," http://www.aeroscout.com/content.asp?page=Log Apps, Printed Aug. 28, 2004, 2 Pages.

AEROSCOUT, "Supply Chain Visibility Applications Application Note," San Meteo, California, 5 Pages, 2004.

AEROSCOUT, "Manufacturing," http://www.aeroscout.com/content.asp?page=Manufacturing, Printed Aug. 28, 2004, 2 Pages.

AEROSCOUT, "Location and Distance-based Applications in Health Care Applications Note," San Mateo, California, 5 Pages, 2004.

AEROSCOUT, "Location-based Wireless LAN Security Application Note," San Mateo, California, 4 Pages, 2004.

AEROSCOUT, "Child Tracking Application at Legoland Customer Case Study," San Mateo, California, 5 Pages, 2004.

AEROSCOUT, "Enterprise Visibility Applications in Retail Application Note," San Mateo, California, 4 Pages, 2004.

Rajit Gadh, "The State of RFID: Heading Toward A Wireless Internet of Artifacts," ComputerWorld, http://computerworld.com/printthis/2004/0,4814,95179,00.html, Printed Aug. 16, 2004, 6 Pages.

EMBER, "Reliable, Secure, Easy-to-Use Embedded Wireless Networking," http://www.ember.com/company/about.html, 2 Pages, Aug. 18, 2004.

EMBER, "EmberNet—Fact Sheet," http://www.ember.com/products/family/embernet.html, Printed Aug. 18, 2004, 3 Pages.

EMBER, "EM1020," http://www.ember.com/products/family/narrow.html, Printed Aug. 18, 2004, 3 Pages.

EMBER, "EM2420—Fact Sheet," http://www.ember.com/products/family/spread-2420.html, Printed Aug. 18, 2004, 4 Pages.

EMBER, "Ember Evaluation Kit," http://ember.com/products.family/evaluation.html, Printed Aug. 18, 2004, 3 Pages.

EMBER, "Ember Developer Kit," http://www.ember.com/products/family/development.html, Printed Aug. 18, 2004, 3 Pages.

WHERENET, "Visibility Server Software," http://www.wherenet.com/products_visibserv.html, Printed Aug. 18, 2004, 4 Pages.

WHERENET, "WhereNet Survey Underscores Need For Real-Time Asset Management Solutions," 3 Pages, Aug. 2004.

Thomas E. Turner, "Real Time Locating Systems," WhereNet, Santa Clara, California, Dated Nov. 1999, 7 Pages.

WHERENET Corp, "Supply Chain—Transportation Logistics, Auto & Industrial Manufacturing," www.wherenet.com, Printed Oct. 18, 2001, 4 Pages.

WHERENET, "Company Overview," http://www.wherenet.com/industries-companyoverview.htm, Printed Oct. 18, 2001, 2 Pages.

WHERENET, "Products," http://www.wherenet.com/products-locationantenna.htm, Printed Oct. 18, 2001, 1 Page.

WHERENET, "WhereTag—Products," http://www.wherenet.com/products-wheretag.htm, Printed Oct. 18, 2001, 2 Pages.

Savi Technology, Inc., "SaviTag—ST-602," Dated Jan. 6, 2003, 1 Page.

Savi Technology, Inc., "RFID Technology—SaviTag ST-604," Dated Jan. 8, 2003, 1 Page.

Savi Technology, Inc., "Active RFID Technology—SaviTag ST-654 High Performance Tag," Dated Mar. 2, 2004, 1 Page.

Savi Technology, Inc., "RFID Technology—Savi Mobile Reader SMR-650P," Dated Dec. 9, 2003, 1 Page.

Savi Technology, Inc., "Active RFID Technology—Savi Fixed Reader SR-650," Dated Feb. 11, 2004, 2 Pages.

Savi Technology, Inc., "RFID Technology—Savi Signpost SP-600-111," Dated Jan. 6, 2003, 1 Page.

Savi Technology, Inc., "EchoPoint RFID-Data Collection," http://www.savi.com/products/pr.rfid.shtml, Dated Aug. 18, 2004, 1 Page.

Savi Technology, Inc., "Savi's Active RFID Technology—The Savi DoD Supplier RFIS Compliance Starter Kit," Dated Feb. 9, 2004, 2 Pages.

Jay Werb & Colin Lanzi, "The Practical Engineer," IEEE Spectrum, Dated Sep. 1998, pp. 71-78.

International Search Report & Written Opinion, PCT/US05/30272, Apr. 20, 2006, 8 Pages.

* cited by examiner

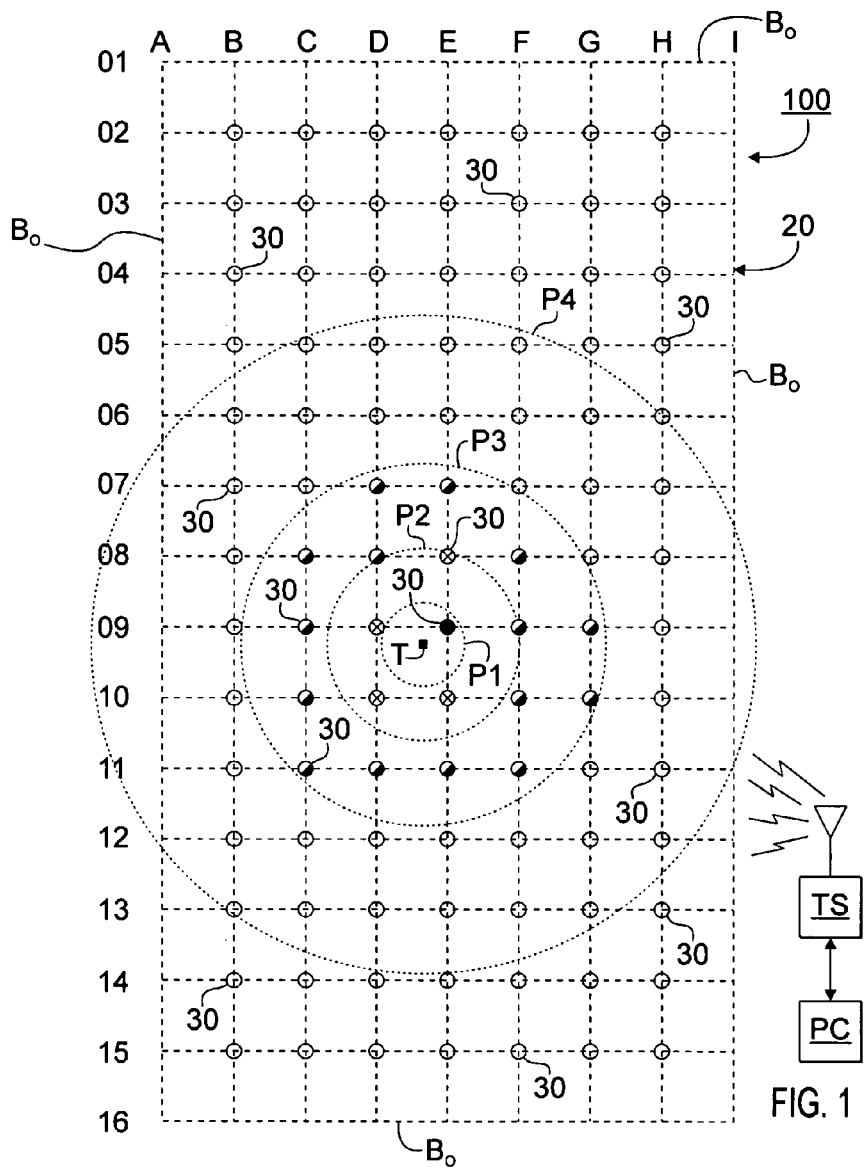
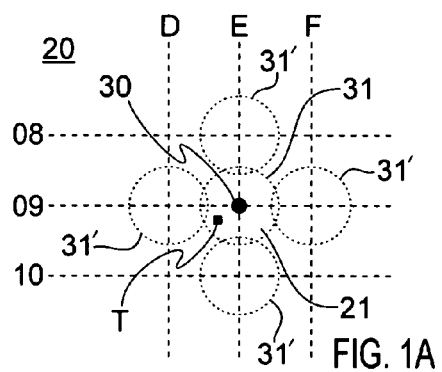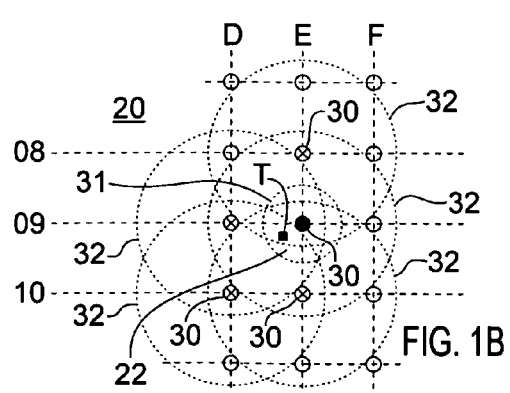

OBJECT MONITORING, LOCATING, AND TRACKING METHOD EMPLOYING RFID DEVICES

This Application claims the benefit of:
U.S. Provisional Application Ser. No. 60/605,287 filed Aug. 26, 2004,
U.S. Provisional Application Ser. No. 60/607,404 filed Sep. 3, 2004,
U.S. Provisional Application Ser. No. 60/628,866 filed Nov. 15, 2004,
U.S. Provisional Application Ser. No. 60/657,948 filed Mar. 2, 2005,
U.S. Provisional Application Ser. No. 60/660,033 filed Mar. 9, 2005,
U.S. Provisional Application Ser. No. 60/663,837 filed Mar. 21, 2005, and
U.S. Provisional Application Ser. No. 60/672,002 filed Apr. 15, 2005.

The present invention relates to a method for monitoring an object and, in particular, to a method therefor employing an RFID device.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

Conventional RFID tag locating systems typically employ triangulation techniques wherein differences in the timing of receptions of a transmission by an RFID tag by at least three readers are employed to derive the location of the RFID tag. The timing of the receptions must be known to very high accuracy so that the differences can be determined with sufficient precision to permit calculation of a transmitting location. As a result, the tag readers are expensive and the system utilizing them is quite complex and expensive. The RFID tags utilized therewith transmit at a predetermined power level either periodically or in response to an interrogation or other signal.

Such triangulation techniques not only require a precise common time reference, but also involve substantial estimation, calculation and mathematical processing. Thus, the "readers" therefor tend to be complex and expensive, and the locating accuracy is in substantial part dependent upon the number and location of the readers and in maintaining very small differences in tolerance and timing. Moreover, "line-of-sight" communication is necessary between the tag and each of the readers because differences in time caused by longer and/or indirect transmission paths directly and adversely affect the accuracy of the location determined by triangulation.

Accordingly, there is a need for an RFID monitoring arrangement that does not require complex and expensive timing information and that can employ relatively simple RFID devices.

A method for monitoring a container having an RFID device interior comprises periodically transmitting messages including unique identifying information and receiving messages transmitted by the RFID device interior the container by a receiving device exterior the container. Some messages transmitted when the container is closed are not received by the receiving device, and some messages transmitted when the container is not closed are received. The method comprises storing and/or relaying the received messages and determining from the number of messages received from the RFID device that are stored and/or relayed whether the container has or has not been opened. The method may also comprise transmitting the messages at two or more power levels and selecting messages that are at the lowest power level that produces at least two corresponding stored and/or relayed messages for determining the location of the RFID device.

BRIEF DESCRIPTION OF THE DRAWING

The detailed description of the preferred embodiment(s) will be more easily and better understood when read in conjunction with the FIGURES of the Drawing which include:

FIG. 1 is a schematic diagram of an example embodiment of a system according to the present arrangement disposed in an area including a plurality of relay devices for monitoring an object in the area;

FIGS. 1A and 1B each illustrate a portion of the area illustrated in FIG. 1 in the vicinity of the object;

Figure 2:
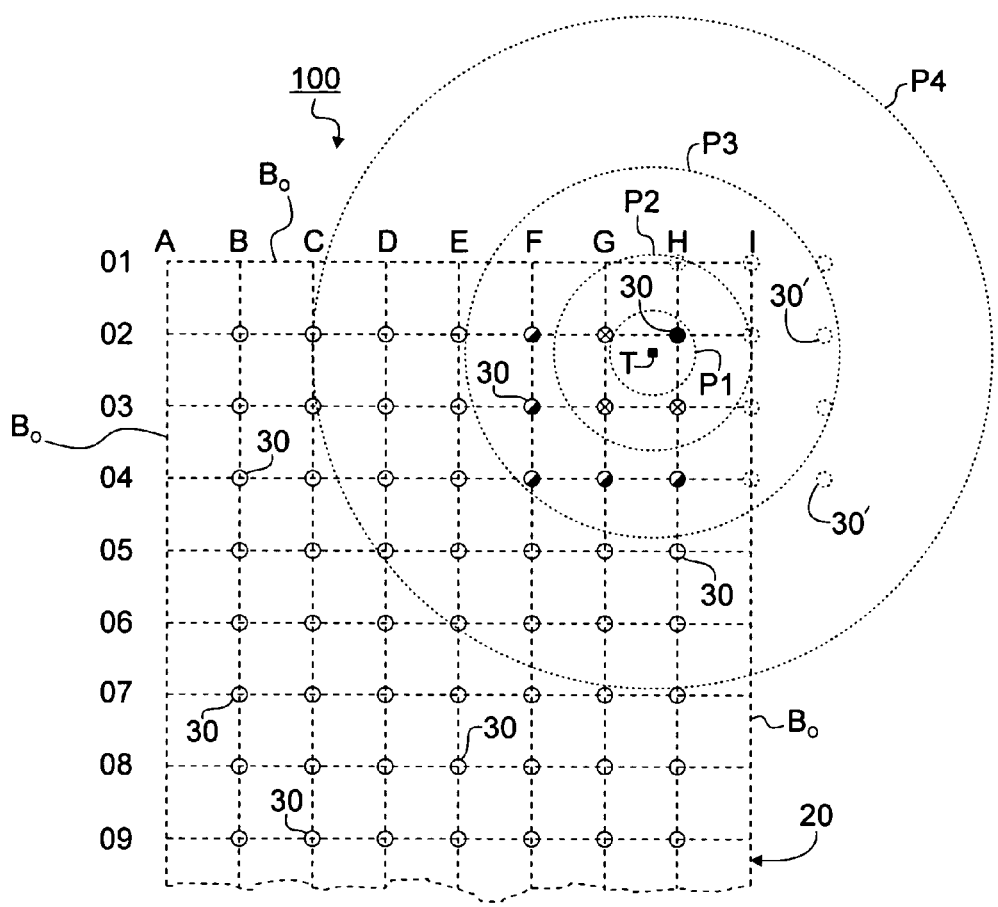
FIG. 2 is a schematic diagram of an example embodiment of a system according to the present arrangement disposed in an area including a plurality of relay devices for monitoring an object in the area, wherein the object is near a boundary of the area.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

A system and method is described for monitoring objects having radio frequency identification (RFID) devices associated therewith. The system 100 comprises a plurality of relay devices 30 disposed in an area 20 for receiving radio frequency transmissions from one or more RFID tags T that are in the area 20 and for reporting such reception to a central device. Each RFID tag preferably transmits electromagnetic signals at different relative levels of transmitted power at different times, e.g., according to a defined sequence. Signals received by the relay devices 30 and the transmitted relative power level of the received signals are employed to locate the RFID tag T when it is within the area 20. Monitoring includes, but is not limited to, locating and/or tracking.

FIG. 1 is a schematic diagram of an example embodiment of a system according to the present arrangement disposed in an area 20 including a plurality of relay devices 30 for locating and/or tracking an object T in the area 20, wherein the object has an RFID device T associated therewith, and FIGS. 1A and 1B illustrate a portion of the area 20 FIG. 1 in the vicinity of the object T for illustrating a locating condition. In example area 20, the intersections of a grid are defined by columns identified as columns A through I and by rows identified as rows 01-16. The plurality of relay devices 30 are arranged in an array with the relay devices 30 located, by way of example, at the intersections of the grid defined by columns identified as columns B through H and by rows identified as rows 02-15, wherein relay devices 30 are not provided for columns A and I and for rows 01 and 16 which define the boundary or perimeter Bo of area 20. At least one tracking station TS is located for communicating with the relay devices 30

The area 20 is illustrated by way of example as being rectangular (e.g., two dimensional) for simplicity in describing system 100 and its operation, however, area 20 may be an area or volume of any desired shape and size, i.e. a space in one, two or in three dimensions. Example two dimensional area 20 has a perimeter or boundaries defined by the columns A and I and by the rows 01 and 16. Area 20 may represent a warehouse, a storage or other yard, the hold of a ship, the deck of a ship, the passenger space(s) of a ship, a dock, a terminal, an airplane cargo space or passenger space, any conveyance, any other location, and any combination of any two or more thereof. Tracking station TS is located at a location within communication range of relay devices 30. While tracking station TS may be relatively proximate area 20, e.g., as where communication is via a radio frequency link, it may in fact be located remotely from area 20, e.g., where communication is by a path including one or more of wires, telephone, a radio link, a network, the Internet, an intranet, a LAN, a WAN, a wireless network, an ad hoc network, a satellite, or a combination of any two or more thereof.

A processing computer PC, which may be at tracking station TS or may be remote therefrom and in communication therewith, receives reports for tracking station TS of receptions of information by relay devices 30 and processes such reports for locating RFID tag T. Communication between tracking station TS and processing computer PC may be by a path including one or more of wires, telephone, a radio link, a network, the Internet, an intranet, a LAN, a WAN, a wireless network, an ad hoc network, a satellite, or a combination of any two or more thereof.

Similarly, while relay devices 30 are illustrated by way of example as being disposed in a uniform array, e.g., on a grid in rows and columns, for ease in describing system 100, relay devices 30 may be located in any desired pattern and at any desired locations within an area 20 of any desired shape and size. Relay devices 30 do not need to be in any pattern or order so long as their relative locations are known. Relay devices 30 may be referred to by their locations on the grid of example area 20. For example, the relay device 30 located at the upper lefthand corner of area 20 may be referred to as relay device A-01, the relay device 30 at the intersection of column E and row 09 may be referred to as relay device E-09, and so forth.

Each relay device 30 is in communication with a tracking system, e.g., by radio frequency, optical, conductive, or other communication means, or a combination of any two or more thereof, for communicating information received from RFID tags to at least one tracking station TS. Preferably, relay devices 30 communicate information received from an RFID tag substantially contemporaneously with the receipt thereof, however, substantially contemporaneously includes periodically and may include a time delay, e.g., a period or delay that is relatively shorter than the time it takes for an object and its associated RFID tag to move a significant distance within area 20. It is not necessary for operation of system 100 that time be known to any great precision with respect to the system 100 or to any relay device 30 or any RFID tag T, although date and time to the hour and minute would typically be associated with each detection of an RFID tag T within area 20. It is sufficient that plural receptions by one or more relay devices 30 of one or more relatively close in time transmissions by an RFID tag T be associable with each other so that the location of RFID tag T may be determined therefrom.

For example, if the objects are shipping containers in a shipping yard 20 that move relatively slowly, e.g., 1 meter/sec., and the relay devices 30 are relatively far apart, e.g., 250 meters, then transmissions every 1-3 minutes would be satisfactory to provide substantially "real-time" location and tracking information. On the other hand, if one were locating and/or tracking passengers in a terminal where the relay devices were about 10 meters apart, relay devices 30 should transmit received information to the tracking system about every 2-5 seconds or less. Similarly, an RFID tag T associated with a relatively slow moving object, e.g., a shipping container, could be programmed to transmit information relatively less frequently and an RFID tag T associated with a relatively faster moving object, e.g., a person or luggage, could be programmed to transmit relatively more frequently. For example, RFID tags T may be moving relatively quickly, e.g., as where RFID tagged containers are on vehicles passing one or more relay devices 30, or where a relay device 30 is located where it receives signals from passing trains carrying truck trailers, storage containers, shipping containers and the like.

For example, if the objects to be located are relatively large, e.g.,such as truck trailers or shipping containers, then the relay devices 30 may be spaced relatively far apart, e.g, at 20-50 meter spacing, and provide suitable locating accuracy. If the objects to be located are relatively small, e.g.,such as computers or baggage, then the relay devices 30 may be spaced relatively closer, e.g, at 10 meter or closer spacing, to provide suitable locating accuracy. Once the object is located as being within a defined region using the system and method described herein, it may be found easily by inspecting that region, e.g., visually or using a hand-held reader device with a limited and/or adjustable sensitivity/reception range.

RFID tag T preferably transmits identifying information periodically and at different levels of transmitted power. In the example illustrated, RFID tag T transmits at four different power levels from a relatively low power level P1 to a relatively high power level P4, and at relatively lower and higher intermediate power levels P3 and P4. The concentric dashed circles centered on RFID tag T represent the transmission ranges corresponding to power levels P1, P2, P3 an P4, respectively. RFID tag T must transmit identifying information at least at two different power levels, although a greater number of different power levels, e.g., four or six, or more, may be employed.

Preferably, the identifying information transmitted by each RFID tag T includes not only information identifying the tag T, e.g., a unique code or number, but also includes information identifying the power level at which the information is transmitted. For example, if a tag identified as tag "xyz123" were to transmit at power levels P1, P2 and P3 in succession, the information transmitted would represent "xyz123-P1" "xyz123-P2" and "xyz123-P3" in succession.

Typically, RFID tag T transmits periodically at two to six different power levels, and may do so on a self-controlled sequencing basis or on a random basis. RFID tag T may initiate the transmission of its identifying information or may transmit in response to an interrogation signal, e.g., from a relay device 30 or other interrogating device, or both. The time between or period of transmissions would typically be set longer or shorter depending upon how quickly the object with which the RFID tag T is associated is expected to move, similarly to the consideration in the preceding paragraph for relay devices 30.

The method for operating system 100 is as follows. An RFID tag transmits its identifying information at a plurality of different power levels and so a successively greater number of the relay devices receive the transmitted RFID tag identifying information as the transmission power level successively increases. Although a location for the RFID tag can be determined using any transmission of identifying information that is received at one or more relay devices, it is preferred that the location be determined from the receptions of the lowest power level transmission that is received by plural relay devices.

Consider an RFID tag T that is located at a location within area 20, e.g., between columns D and E and between rows 09 and 10 in the illustrated example of FIG. 1, and that transmits its identifying information at a first power level, e.g., at the relatively low power level P1. Because only the relay device 30 at location E-09 is within the circle P1 having a radius corresponding to the transmission range of RFID tag T at power level P1, only the relay device 30 at location E-09 (indicated by a filled-in circle) receives the identifying information transmitted by RFID tag T and relays it to the tracking station TS which may be located anywhere within communication range of relay devices 30. Thus, RFID tag T is known to be located within a circle 31 of the same radius as circle P1 and having relay device 30 at location E-09 at its center, as illustrated in FIG. 1A.

In addition, and optionally, the location of RFID tag T within area 20 may be further determined because RFID tag T is not within any of the power level P1 circles 31' (illustrated by dashed lines) that are centered on the relay devices 30 in the adjacent rows and columns to the relay device 30 at location E-09 and that did not receive the information transmitted by RFID tag T, as also illustrated in FIG. 1A. In the illustrated example, relay devices 30 at grid locations D-08 to D-10, E-08, E-10, and F-08 to F-10 do not receive the information transmitted by RFID tag T at the relatively low power level P1, and RFID tag T is determined to be within the area 21. Area 21 (marked by heavy dashed lines) is smaller than the circle 31 centered on relay device 30 at location E-09 and so the location of RFID tag T is known with somewhat greater precision when the circles 31 and 31' are all considered and only the transmissions at power level P1 are considered.

When RFID tag 20 transmits its identifying information at a second power level, e.g., at the relatively higher power level P2, relay devices 30 at locations D-09, D-10, E-08, E-09 and E-10 (indicated by a circle enclosing an "x") are within the circle P2 corresponding to the transmission range at power level P2. Only relay devices at locations D-09, D-10, E-08, E-09 and E-10 receive the identifying information transmitted by RFID tag T and relay it to the tracking station TS. Thus, RFID tag T is determined to be located within an area bounded by locations D-09, D-10, E-08, E-09 and E-10 and, if a transmission at power level P1 had been received, also within a circle 31 of the same radius as circle P1 having relay device E-09 at its center. The location of RFID tag T may easily be determined from the known locations of relay devices at D-09, D-10, E-08, E-09 and E-10 to within an accuracy that is substantially less than the spacing between relay devices D-09, D-10, E-08, E-09 and E-10.

Specifically, in the example illustrated in FIG. 1B, RFID tag T must be within an area that is within each of five circles 32 each centered on one of relay devices D-09, D-10, E-08, E-09 and E-10, respectively. The radius of each of the five circles 32 is the same as the radius of the circle P2 representing the transmission range of RFID tag T when tag T is transmitting at power level P2. Only the portion 22 (shown by heavy dashed lines) of the area 20 is within all of the five circles 32, and so the RFID tag T and its associated object must be located within the area 22, i.e. within all five circles 32. Logically, this area 22 may be referred to as the intersection of the circles 32 for the relay devices 30 receiving information transmitted by RFID tag T at power level P2.

In the foregoing example as illustrated in FIG. 1B, plural relay devices 30, specifically five relay devices 30, receive the identifying information transmitted by RFID tag T at power level P2, and so this condition is the preferred condition for determining the location of RFID tag T considering only received transmissions at one power level typically, only two or three receptions at a given power level are sufficient for determining the location of an RFID tag T with a useful accuracy, and increasing the number of receptions significantly, e.g., beyond four or five, usually does not proportionally increase the accuracy of the location determination. Accordingly, the reception information relating to the lowest power level at which plural receptions are received from an RFID tag T is typically utilized for determinating its location.

More preferably, the fact that one relay device 30 also received a transmission at power level P1 may be taken into account so that the power level P1 circle 31 for the relay device 30 at grid location E-09 would be utilized with the four power level P2 circles 32 for the relay devices at grid locations D-09, D-10, E-08 and E-10 to determine the region 22 within which RFID tag T is located. Because the lower power level circle 31 included in the determination of location is smaller in diameter that are the higher power level circles 32 also included in the determination of location, a greater "weight" is in effect given to the message received at the lower power level, at least to the extent that the size of location region 22 is reduced as a result.

In some instances it may be that messages transmitted by an RFID tag T at a given power level or at different power levels are received by two or more relay devices 30 wherein there is no ordinarily intersecting area for the circles 31, 32 corresponding to the received messages and power levels of the sort illustrated in FIGS. 1A and 1B. This could arise, for example, due to objects blocking transmissions, weather and other environmental conditions, reflections and other interferences and the like. In such instances, alternative locating processes may be employed to overcome the effect of the less than ideal reception of the messages transmitted by the RFID tags T by relay devices 30.

One alternative process is advantageous where there are, e.g., two receptions of messages transmitted by an RFID tag T at a given power level that do not produce intersecting circles 31 or 32. In this alternative process, processor P processes the received messages by in effect increasing the effective radius assigned to the applicable circles 31, 32 associated with the relay devices 30 that received the transmitted messages until an intersection of the enlarged circles occurs. This process can be utilized whether the received messages were transmitted at the same or at a different power level. Preferably the effective radius of the circles 31, 32 are increased proportionately until an intersection occurs. It is highly likely that the RFID tag T and its associated object are located in or near to that intersection or "center of gravity." In effect, processor P weights the received messages relative to their respective power levels and receptions for determining a location of the RFID tag T and its associated object. This process may be referred to as "dynamic zoning" herein.

Another process therefor includes selecting any two relay devices 30 that have received messages transmitted by an RFID tag T and assigning respective weights thereto according to their respective power levels, e.g., as indicated by the power level codes in the respective messages. The "center of gravity" for the selected relay devices 30 is determined from the messages received thereby and the weights assigned thereto. The "center of gravity" location is then assigned a weight value based upon the weights that were assigned to the selected two relay devices 30. Then, if there is a third relay device 30 that received a message transmitted by the RFID tag T, that relay device 30 is selected and is processed to obtain the center of gravity of the combination of that relay device and the previously determined center of gravity, which should provide a refined determination of the location of the RFID tag T. If there are other relay devices 30 that have received a message transmitted by that RFID tag T, then those relay devices 30 are likewise processed as described in the preceding sentences to thereby recursively redetermine the location of RFID tag T until all relay devices 30 that have received a message have been processed, whereby a "final" determination of the location of RFID tag T is determined. In effect, processor P weights the messages that are received relative to their respective power levels and receptions so as to recursively determine a location for the RFID tag T and its associated object therefrom. This process may be referred to as "recursive zoning" herein.

With regard to both "dynamic zoning" and "recursive zoning" and the other processes described, it is understood that the circles are mathematical constructs utilized in the computer-implemented processes for locating and tracking RFID devices and their associated objects, and that increasing the radius, weighting, and other physical-sounding variations utilized in such processes are effected by applying various factors and scaling in performing the computer-implemented processes.

In the foregoing method, the relayed messages may be selected and given a defined radius value representative of the power level of each relayed message, and for each RFID device, the intersection of respective geometric shapes, e.g., circles or spheres, having the defined radius values are determined for locating that particular RFID device in the intersection. If the respective geometric shapes having the defined radius values do not intersect, then the radius values may be proportionately increased until the respective geometric shapes do intersect. Determining the intersection of respective geometric shapes having the defined radius values may comprise determining the intersection of first and second ones of the respective geometric shapes having defined radius values, then determining the intersection of a third one of the respective geometric shapes having defined radius value with the intersection of the first and second ones thereof, and then repeating the immediately preceding determining step for each additional one of the respective geometric shapes, if any, until all of the respective geometric shapes for the particular RFID device are used.

In other examples wherein RFID tag T is located at a different example location in area 20, the information it transmits at power level P2 could be received at a greater number or at a lesser number or at the same number of relay devices 30, e.g., at four or at five or at six relay devices 30, and the locating method is the same except that the number of relay devices is correspondingly lesser or greater, i.e. RFID tag T is located in an area defined by the intersection of the circles 31, 32 of those relay devices 30 that receive the information transmitted by RFID tag T.

When RFID tag 20 transmits its identifying information at a third power level, e.g., at the relatively higher power level P3, relay devices 30 at locations C-08 to C-11, D-07 to D-11, E-07 to E-11, F-07 to F-11 and G-09 to G-10 (indicated by a half-filled circles) are within the circle P3 corresponding to the transmission range at power level P3 and receive the identifying information transmitted by RFID tag T and relay it to the tracking station TS. Thus, RFID tag T is known to be located within an area bounded by relay devices C-08 to C-11, D-07 to D-11, E-07 to E-11, F-07 to F-11 and G-09 to G-10 and, if one or more transmissions at a lower power level P1 or P2 had been received, within circles of the same radius as circle P1 or P2 as above. The location of RFID tag T may easily be found from the known locations of relay devices C-08 to C-11, D-07 to D-11, E-07 to E-11, F-07 to F-11 and G-09 to G-10 to within an accuracy that is substantially less than the spacing between relay devices C-08 to C-11, D-07 to D-11, E-07 to E-11, F-07 to F-11 and G-09 to G-10.

Specifically, in the example illustrated for power level P3, RFID tag T must be within an area that is within each of twenty-one circles each centered on one of relay devices C-08 to C-11, D-07 to D-11, E-07 to E-11, F-07 to F-11 and G-09 to G-10, respectively. The radius of each of the twenty-one circles is the same as the radius of the circle P3 representing the transmission range of RFID tag T when tag T is transmitting at power level P3. RFID tag T and its associated object must be located within the area that is within all twenty-one circles, i.e. is in the logical intersection of the twenty-one power level P3 circles.

In a different example, if RFID tag T is located at a different location, its information transmitted at power level P3 could be received at a greater number or at a lesser number or at the same number of relay devices 30, and the locating method is the same except that the number of relay devices may be correspondingly lesser or greater.

If tracking station TS has received plural reports of reception of identifying information transmitted at higher power level P3 and plural reports of receptions at lower power level P2, for example, it would usually be preferred to locate the RFID tag T using the power level P2 information if the number of receptions thereof is sufficient for location determination, rather than to process the greater number of receptions corresponding to the power level P3 information, which processing would generally be more extensive and complex due to the greater number of receptions. In general, the number of receptions necessary to locate an RFID tag T to within a locating accuracy that is significantly less than the spacing of the relay devices 30 can be as low as two for relatively low power level transmissions, however, at least two to four reception reports are preferred.

Where RFID tag T transmits at the relatively high power level P4, a greater yet number of relay devices 30 receive the information transmitted thereby and the method for locating RFID tag T is the same as that described above taking into account the greater number of relay devices 30. If tracking station TS has received reports of reception of information transmitted at power level P4 and at a lower power level, e.g., P3 or P2, it would usually be preferred to locate the RFID tag T using the lowest power level information which is sufficient for location determination rather than to process the more extensive and complex at a higher power level, e.g., power level P4 information.

On the other hand, the array of the plurality of relay devices 30 may include relay devices 30 spaced apart by a distance greater than the reception radius of information transmitted, for example, at the relatively low power level P1 and so only transmissions at power levels P2 and higher will be received by relay devices 30, in which case the locations of the relay devices 30 receiving transmissions at power level P2 or higher are utilized for determining the location of the RFID tag T. Likewise, the array of the plurality of relay devices 30 may include relay devices 30 spaced apart by a distance greater than the reception radius of information transmitted at the power levels P1 and P2, and so only transmissions at power levels P3 and higher will be received by relay devices 30, in which case the locations of the relay devices 30 receiving transmissions at power level P3 or higher are utilized for determining the location of the RFID tag T, and so forth.

Such situations may arise, for example, where an object and its associated RFID tag T travel through one or more facilities wherein the spacing of relay devices 30 differs. For example, an RFID tag T might travel to a first warehouse that might have the relay devices 30 relatively closely spaced, to a dock area where relay devices 30 are relatively widely spaced, and to a ship's hold where relay devices are spaced apart an intermediate distance. Another example could be where an RFID tag T may move within a facility wherein the spacing of the relay devices 30 differs substantially at different locations therein. Another example could be where the RFID tag T is associated with a person who travels to various buildings or other facilities having different arrays of relay devices 30, as well as to areas outside of buildings, e.g., parking lots, roads, etc, where the spacing of the relay devices 30 is greater than it is in buildings. In addition or alternatively, such situation may arise where objects associated with RFID tags T of different types or of different manufacturers are in a location wherein the spacing between the relay devices 30 is different than the spacing that would be desirable for use with RFID tags of such types.

Where information is received from an RFID tag T at different relay devices 30 as the RFID tag T transmits information at different relative power levels, the relative power level of each transmission can be deduced from the numbers of relay devices 30 that receive each transmission, because higher power transmissions will be received by more relay devices 30. For example, if three respective transmissions are received by one, by five and by twenty relay devices 30, it is apparent that the transmission received by one relay device 30 was transmitted at a relatively lower power level, the transmission received by the twenty relay devices 30 was transmitted at a relatively higher power level, and the transmission received by five relay devices 30 was transmitted at an intermediate power level.

While the ambiguity between the example three transmissions being at power levels P1-P2-P3, or at power levels P2-P3-P4, for example, could be resolved to some degree of certainty (e.g., with pre-programming and/or testing), it is not necessary for the described method to know the power level, it is only necessary that given receptions are related to a given transmission. Correlation of transmissions and receptions of identifying information by an RFID tag T may be determined from the times thereof (which time does not have to be known with precision due to the relatively low repetition rate of such transmissions) or from coded power level information included in the transmission of identifying information by the RFID tags T.

Typically, information transmitted at a relatively low power level that is received by a relatively small number of relay devices 30, e.g., as few as two, but preferably at least three, from a transmission from an RFID tag T is sufficient for locating that RFID tag T to an accuracy substantially less than the spacing between relay devices. Transmissions at relatively higher power levels that are received by a larger number of relay devices 30, while sufficient for locating the RFID tag T, are generally not as efficient because a greater number of reception reports from relay devices 30 must be processed to determine the location of the RFID tag T. Tracking an object by locating its associated RFID tag T is accomplished by accumulating a record of the locations of the tag T over time, e.g., in a computer database, which may be in the processing computer PC or another computer.

Preferably, where the identifying information transmitted by each RFID tag T includes information identifying the tag T and information identifying the power level at which the information is transmitted, the locating method is simplified and is made more accurate because the transmission power level corresponding to each received signal is known without ambiguity from the information in the received transmission thereby to define the radius of the circles 31, 32, etc. to be utilized in locating tag T. Also, system 100 is preferably monitored by processor PC at least periodically to confirm that at least all of relay device 30 thereof are present and operating, and preferably that all of the RFID tags T present and all of relay devices 30 are present and operating, thereby to provide security against tampering with elements of system 100 and to determine if, when and where inspection, maintenance and/or repair may be indicated.

In a typical system 100, RFID tags T may transmit at power levels P1-P4 that can be received by relay devices 30 at various distances, e.g., distances in the range as short as about 2-9 meters (about 5-30 feet) and as long as about 45-180 meters (about 150-600 feet). It is noted that the transmissions from RFID tags T radiate in three dimensions, i.e. in a spherical volume or space, and so a three-dimensional system 100 is envisioned, wherein location is determined in three dimensions based upon the intersections of transmission spheres of radii corresponding to power levels P1, P2, P3 and so forth, rather than on intersections of transmission circles in the two dimensional example described in detail. Three dimensional areas may include, for example, plural-floor warehouses, shelving systems in warehouses or stores or other locations, plural deck ships and aircraft, holds and decks of a ship wherein containers are stacked, a dock or loading area wherein containers are stacked, and the like. System 100 may also be employed with what could be considered as a one dimensional case, such as along a road, street, highway, railroad track, aisle, corridor, and the like, wherein location only with respect to a length or distance is of interest.

Figure 2A:
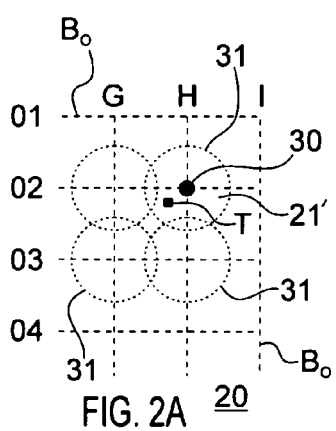
FIGS. 2A and 2B each illustrate a portion of the area illustrated in FIG. 2 in the vicinity of the object.
Figure 2B:
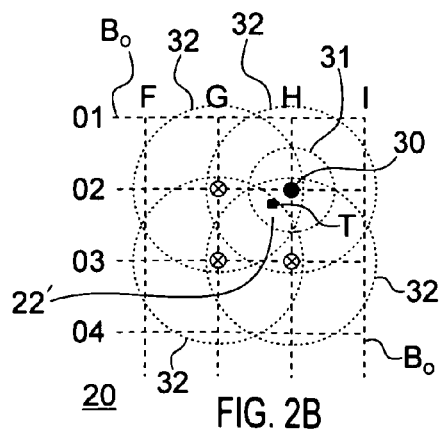

FIG. 2 is a schematic diagram of an example embodiment of a system 100 according to the present arrangement disposed in as area 20 including a plurality of relay devices 30 for locating and/or tracking an object T in the area 20, wherein the object is near a boundary Bo of the area 20, and FIGS. 2A and 2B illustrate a portion of the area 20 FIG. 2 in the vicinity of object T for illustrating a locating condition. In this example, RFID tag T is located near a corner defined by two adjacent ones of boundaries Bo.

As described above, relay devices 30 are located at the intersections of columns B-H and rows 02-15, and so no relay devices are located along the boundary rows 01 and 16, and boundary columns A and I, or outside the bounded area 20 (as indicated by the small dashed circles 30'). In the situation illustrated in FIGS. 2, 2A and 2B, only the relay device 30 at location H-02 (indicated by a filled-in circle) receives information transmitted by RFID tag T at relatively lower power level P1, and so RFID tag T must be within a circle 31 of like radius to the reception range for information transmitted at power level P1 centered on the location of that relay device 30. Where the reception areas covered by adjacent relay devices 30 at locations G-02, G-03 and H-03 that do not receive the information transmitted by RFID tag T at power level P1 are considered, the area 21' (shown by heavy dashed lines) is determined which is smaller than the area defined by circle 31 alone, thereby again offering an improvement, albeit modest, in the precision of the locating of RFID tag T.

For information transmitted at power level P2, relay devices 30 at locations G-02, G-03, H-02 and H-03 (indicated by circles having an "x" therein) receive the information transmitted by RFID tag T, and because there is no relay device at location H-01, information that would have been received at that location is not received by a relay device and so is not reported. Using only these four relay devices 30, the location of RFID tag T is determined to be within the intersection of the four power level P2 circles 32, which is an area larger than area 22 in the example of FIGS. 1-1B, due to the lesser number of relay devices 30 that receive the information transmitted by RFID tag T.

If, however, consideration is given to relay device 30 at location H-02 also receiving the information transmitted at power level P1, then the locating accuracy of system 100 improves. Thus, RFID tag T is determined to be within an area 22' which is slightly larger than is the area 22 when more relay devices 30 receive the information transmitted at power level P2. At higher power levels, e.g., P3 and P4, while greater numbers of relay devices 30 receive the information transmitted at that power level, there are a greater number of locations along and outside of the perimeter B that are within the transmission range of the information transmitted by RFID tag T at which there is no relay device to receive and report such transmission. In addition, location information determined by system 100 at more than one power level P1, P2, P3, . . . may be combined when an RFID tag T is near the perimeter B of area 20 so as to obtain a more accurate location than is determined from one power level.

The method described above operates to locate RFID tag T in the manner described in relation to FIGS. 1-1B. First, as illustrated by FIG. 2A, RFID tag T is located to be within a circle 31 centered on location H-02 having a radius the same as the transmission range of information transmitted at power level P1 based on the report of such reception by the relay device 30 at that location. In addition, and optionally, the location of RFID tag T may be further determined because RFID tag T is not within any of power level P1 circles 31' (illustrated by dashed lines) that are centered on the relay devices 30 in the adjacent rows and columns that did not receive the information transmitted by RFID tag T. Thus, RFID tag T is determined to be within the area 21'.

In addition, as illustrated in FIG. 2B, RFID tag T must be in an area 22' that is within the intersection of the four circles 32 centered about relay devices 30 at locations G-02, G-03, H-02, H-03, respectively, based upon the reports of such reception by the four relay devices 30 at those four locations. Because information that would have been received from a relay device 30 at boundary location H-01 had such device been present, the accuracy of the location 22' of RFID tag T may be slightly less than if a relay device 30 at location H-01 had received and reported the transmission by RFID tag T at power level P2. It is noted, however, that because the circle 31 is of smaller diameter it is effectively given a greater "weight" than are each of the larger diameter circles 32 in determining the location of RFID tag T, at least to the extent that the size of location region 22' is reduced as a result.

Thus it is evident that while the omission of certain relay devices 30, e.g., relay device at or near the boundary Bo of an area 20, may slightly degrade the accuracy of the location determination by system 100, such omission does not compromise the operability of system 100. In like manner, the removal, failure, malfunction of one or more of relay devices 30 in an area 20 does not affect the operability of system 100 therein, although it may degrade the accuracy of the locating of an RFID tag T that is in a location where the information transmitted thereby would have been received and reported by a relay device 30 had that relay device been operative.

Further, the alternative processes for "dynamic zoning" and "recursive zoning" or both may be employed in relation to the method for locating objects that are located near a boundary Bo of a space 20, or in any other setting.

In a preferred example including the described arrangement, the transmission power levels of the RFID tags T and the reception sensitivity of the relay devices 30 are selected to have a transmission-reception range in a range of about 3-300 meters and to provide for periodic RFID device transmissions at least at two different power levels, and more preferably at 4-6 different power levels.

It is not unusual, and may indeed be more usual, that an area 20 may not lend itself to having the array of relay devices 30 located on a regular grid, e.g., in columns and rows, as in the above-illustrated example. In such case, the area 20 may be mapped as a grid having spacings defined to be substantially less than the actual spacings of the relay devices 30, and the relay devices 30 may be located at convenient physical locations. Consider an example wherein relay devices 30 and RFID tags T have a reception range of about 10 meters at the lowest power level P1. An "artificial grid" or "virtual grid" (in one, two or three dimensions, as appropriate) having a grid spacing of about 1 or 2 meters may be overlaid on area/volume 20 and the actual locations of the relay devices 30 thereof are "mapped" to the grid coordinates closest to their actual locations in the space, i.e. each relay device 30 is located/identified by the grid coordinates (e.g, X, Y and Z coordinates) that are closest to its actual location, irrespective of the regularity or irregularity of the actual relay device locations.

In the method for locating an RFID tag T therein, the appropriate power level spheres (e.g., circles in the two dimensional simplified case) corresponding to reported received information transmissions by the RFID tag T are centered on the respective grid location of each relay device 30 that reports receiving the transmission, i.e. on the coordinates of the artificial grid. The locating of RFID tag T in this arrangement employs the same process of finding the region which is within all of the power level spheres at the power level of the received RFID tag T transmission in terms of the artificial grid coordinates. To find an RFID tag T and its associated object, one simply identifies the physical location in the area 20 that corresponds to the determined coordinates (e.g., X, Y and Z coordinates) for RFID tag T on the artificial grid, e.g., on a screen display or a site map, and then proceed to that physical location.

Processing computer PC may be one computer or may be a combination of plural computers/processors, such as one or more local computers in communication with a central computer, processor and/or server, as may be convenient. In the instance of plural computers/processors, reports of received transmissions from a tracking station TS would typically, and preferably, be communicated to the central computer, processor and/or server. Communication between tracking station TS and processing computer PC (including the various local/central computers, processors and/or servers thereof) may be by a path including one or more of wires, telephone, a radio link, a network, the Internet, an intranet, a LAN, a WAN, a wireless network, an ad hoc network, a satellite, or a combination of any two or more thereof.

Figure 3:
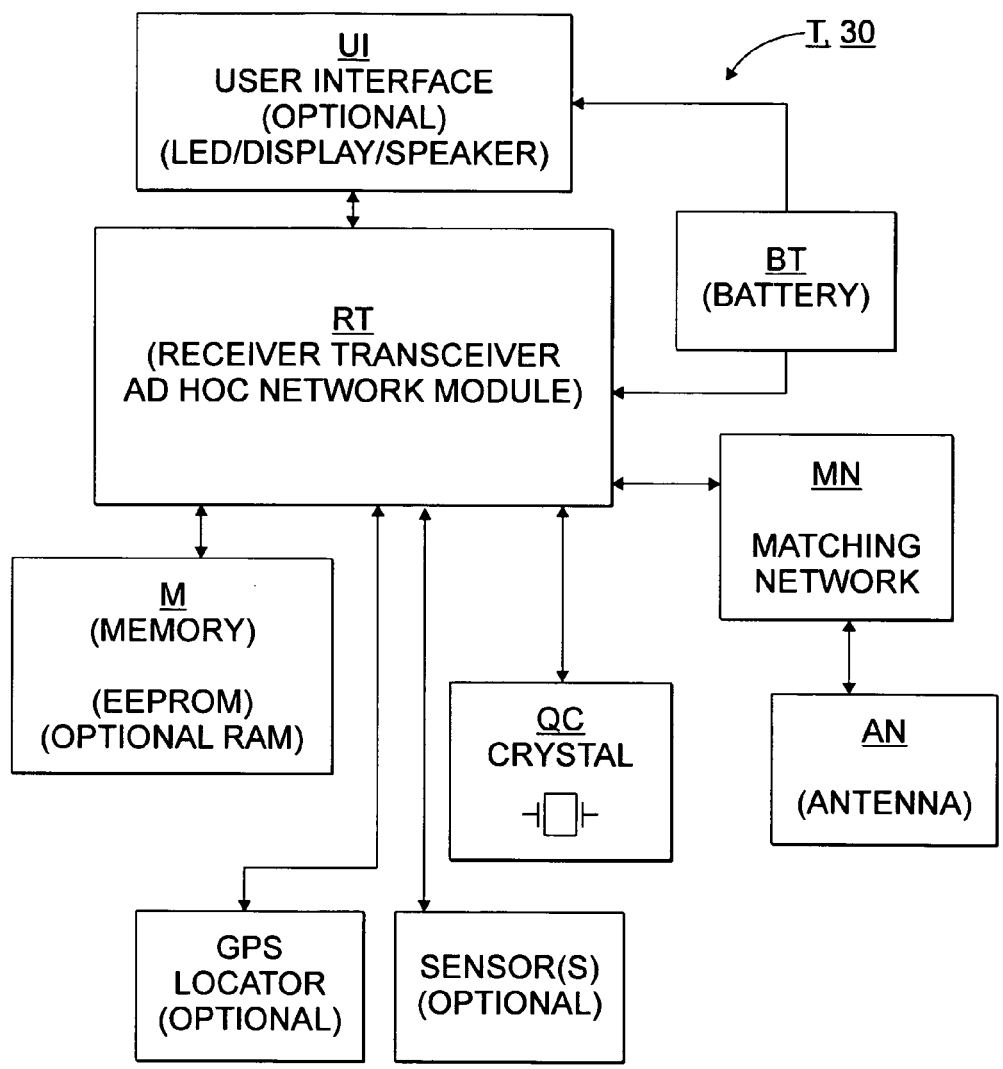
FIG. 3 is a schematic block diagram of an example embodiment of a device that may be employed as an RFID device and/or as a relay device suitable for use with the arrangement of FIGS. 1 and 2.

FIG. 3 is a schematic block diagram of an example embodiment of a device that may be employed as an RFID device T and/or as a relay device 30 suitable for use with the arrangement of FIGS. 1 and 2. Specifically, example device T, 30 is an "active" RFID device in that it includes a source of electrical power, e.g., battery BT, so that it can transmit periodically even when not interrogated by an RFID interrogator, also known as an RFID reader. The principal functional component of RFID device T is a radio transmitter RT that includes a frequency synthesizer, a power amplifier, a crystal oscillator, and a modulator, and a crystal QC connected thereto for establishing the operating and transmission frequencies. Suitable examples thereof include the type nRF905 single chip 433/868/915 MHz transceiver and the type nRF2402 single chip 2.4 GHz transmitter, both of which are available from Nordic VLSI ASA, located in Tiller, Norway. The principal functional component of relay device 30 is a radio transceiver RT that includes a frequency synthesizer, a receiver chain with demodulator, a power amplifier, a crystal oscillator, and a modulator, and a crystal QC connected thereto for establishing the operating and transmission frequencies. An example thereof includes the type nRF905 single chip 433/868/915 MHz transceiver which is available from Nordic VLSI ASA, located in Tiller, Norway.

The modulated output from transmitter RT is coupled via a matching network MN to an antenna AN from which it is transmitted for reception by one or more relay devices 30 that are within transmission range. The example nRF905 transmitter RT provides four selectable levels of transmitted power, e.g., −10 dBm, −2 dBm, 6 dBm and 10 dBm, and can provide transmission ranges of about 4-5 meters, 10-20 meters, 25-35 meters and 40-50 meters, respectively. The example nRF2402 2.4 GHz transmitter RT provides four selectable levels of transmitted power, e.g., −20 dBm, −10 dBm, −5 dBm and 0 dBm, that typically provide relatively shorter respective transmission ranges. Other transmission frequencies, e.g., 127 KHz, 13.56 MHz, 850-950 MHz, may be utilized.

In practice, the transmission frequency and power level may be restricted or controlled by the rules and regulations governing radio transmissions for the location where the RFID tags T and relay devices 30 are utilized. In addition, the transmission frequency and/or power level may be selected in consideration of the type of object with which the RFID tag T will be associated, because the object may have absorption and/or reflection properties for electromagnetic signals at certain frequencies. Examples thereof include metal containers, liquid filled objects and human beings.

While the range (read distance) at which transmissions by an RFID tag T can be received is primarily determined by the electronic circuit (typically an integrated circuit) and antenna utilized therein and the power level programming thereof, the range (read distance) can also be affected by modifying the characteristics of the RFID tag T antenna. For example, the read distance can be modified by making the antenna tuning better or worse to increase or decrease read distance. Further, the antenna of the relay devices 30 may be tuned, or the receiver sensitivity may be adjusted, for a greater or lesser read distance.

In certain instances it may be desirable adjust the distance from which messages may be received. Such adjustment may be accomplished by tuning (de-tuning) some or all of the antennas of RFID devices T, 30 to be more efficient or to be less efficient for obtaining a greater or a smaller read distance whereby the accuracy of the location determination may be adjusted, at least assuming sufficient relay devices 30 to receive the information transmitted by the RFID tags T. In addition, or alternatively, the receivers of relay devices 30 may have adjustable and/or programmable sensitivity so as to produce receptions that may more accurately define the locating region 22. In any event, the read distances for which RFID tags T and/or relay devices 30 are tuned/programmed preferably are such that they provide the desired locating accuracy given the spacing of relay devices 30 in the area 20 being monitored. In general, omni-directional antennas are preferred.

RFID device T and relay device 30 also include a memory device M, typically a read-only memory, although it may be a programable read-only memory such as an EEPROM. Memory device M is coupled to transmitter RT for providing information to be modulated and transmitted thereby, and for providing control information. Information such as a unique identifier or a unique series of identifiers or codes for the device, a transmission power level, a sequence of transmission power levels, one or more transmission time intervals, and the like, may be stored in memory M, e.g., an EEPROM of 4 to 32 kilobyte capacity, or more.

In addition, where a device T, 30 is to store information in operation, the memory M thereof may include memory that can be written to as well as read from, such as a random access memory (RAM). Examples thereof may include storing identifying information received from one or more RFID tags, and/or storing the time and/or location at which such identifying information is received, and/or storing information received from one or more sensors, and/or storing the time and/or location at which such sensor information is received Device T may be arranged to employ a series of unique identifier codes that are suitable for a reusable RFID device T, 30. Initially, RFID device T, 30 is used with the first identifier of the series of unique identifiers until that use is completed. RFID device T, 30 is then reprogrammed for another use wherein it will be associated with a different object or a different location and/or area. Reprogramming the device T, 30 for reuse would preferably include erasing or removing the then current unique identifier by which the device T, 30 is identified and replacing it with the next unique identifier from the series of identifier codes, whereby the device T, 30 is identified by a new and unique identifier. Thus, a reprogrammed device T, 30 when reused is for all intents and purposes a "new" device because it has a new unique identifier, except that the cost of a new device has been avoided, thereby improving the economy of the described arrangement.

Information stored in memory M may include or be protected by a relational check code, such as a parity check and/or cyclic redundancy code (CRC) and/or encryption, for preventing tampering and/or rendering tampering or an attempt thereat detectable. In addition, the information stored in memory M of a relay device 30 may include the location thereof, e.g., in terms of the grid coordinates of an area 20 (e.g., in X, Y and Z coordinates) or in absolute terms, e.g., as determined in connection with placing the relay device 30 in a physical location or by a GPS locator device associated with the relay device 30.

If the physical location of a relay device 30 is known, then that location may be associated with the identifier thereof, e.g., in the computer PC, and need not be stored in the device memory M, but may be stored in memory M if desired. Greater freedom in placement and utilization of relay devices 30 may be obtained where the device 30 includes an optional GPS locator device that determines its location and then includes that location information in the information transmitted by the device 30 when it relays the information received from an RFID tag T. One example thereof is when a relay device 30 is associated with a moveable object, such as a container, truck trailer, or a conveyance such as a ship, truck, container, train, and the like. Transmission/relaying of such information may be by any means, such as those communication and/or network means mentioned elsewhere herein.

Device T, 30 may operate in any one or more modes. In an automatic and continuous operating mode, device T, 30 transmits its identifying information periodically, e.g., every "n" seconds or minutes or hours or days. The rate at which transmissions are produced may be fixed, or may be changed, e.g., may be programmed and/or adjusted either by an internal control or by an external control signal communicated to device T, 30 over an input/output I/O arrangement or wirelessly, e.g., via a relay device 30 or tracking station TS. A return acknowledgment that a transmission from a device T, 30 has been received may or may not be provided. However, if a return acknowledgment is provided, it may or may not be received, e.g., from a relay device 30 or a tracking station TS, and if received, it may or may not be stored in the memory of the device T, 30, as may be desirable. If stored, the return signals may be stored in a first-in/first-out memory so that only limited number of the most recent return acknowledgments are retained. If a return acknowledgment is received, it may be utilized to delay the next transmission of identifying information, if desired.

In another continuous operating mode, a device T, 30 may transmit its identifying information at two or more selectable intervals. The two or more selectable intervals may be predetermined or may be programmable or adjustable, e.g., may be programmed and/or adjusted either by an internal control or by an external control signal communicated to device T, 30 over an input/output I/O arrangement or wirelessly, e.g., via a relay device 30 or tracking station TS. As above, a return acknowledgment, if provided, may or may not be stored in the memory of the device T, 30. A return acknowledgment may be utilized by device T, 30 to change the interval between its transmissions, e.g., receipt of a return acknowledgment may serve as a signal to delay the next transmission or to change the interval between transmissions, or both. For example, a device T, 30 transmitting every 10 seconds may, in response to an acknowledgment of such transmission, then be commanded to utilize a longer transmission interval, e.g., every 60 minutes. Different emitting intervals and rates may be set at any time using any suitable means.

In another operating mode, device T, 30 may place itself into a "sleep" or dormant mode after a transmission sequence is completed. Upon receipt of a proper command or interrogation signal, device T, 30 "wakes up," i.e. it exits its sleep or dormant state, and begins transmitting its identifying information. The transmission of identifying information may be repeated at an defined interval until a return acknowledgment is received, at which event the transmission interval may change, e.g., to longer interval between transmissions, either as a response to such return acknowledgment, or in response to a programming command or signal. Selection of transmission interval, e.g., may be programmed and/or adjusted either by an internal control or by an external control signal communicated to device T, 30 over an input/output I/O arrangement or wirelessly, e.g., via a relay device 30 or tracking station TS. As above, a return acknowledgment, if provided, may or may not be stored in the memory of the device T, 30.

In the cases described in each of the three preceding paragraphs, the transmission rate is typically adjustable over a range from more than about once per second to less than about once per hour or less than about once per day, as may be appropriate to a particular application. Further, in each case, each such transmission typically includes transmissions at two or more different power levels, each transmission preferably including a power level identifier representing the transmission power level. In addition, devices T, 30 preferably have at least two different selectable intervals between transmissions, which intervals may be selected via a programming command or signal, or in response to one or more operating conditions, e.g., receipt of a return acknowledgment.

Where a relay device 30 is arranged for direct communication with a tracking station TS, it may simply retransmit identifying information received from RFID tags T to tracking station TS, and may or may not store such receptions and the times thereof in its memory M. Where a relay device is not in direct communication with a tracking station TS, identifying information received from RFID tags T and the times thereof are stored in relay device 30 memory M for later transmission to a tracking station TS. Any associated messages, e.g., of a detection of sensing by a sensor of an RFID tag T, are likewise stored in memory M of relay device 30.

In the latter instance, relay device 30 may include a wireless radio transmission interface RT that includes functionality for cooperating with other relay devices to establish and maintain an ad hoc network wherein relay devices cooperate to relay reports of received identifying information from RFID tags T to tracking station TS. Examples of wireless network interfaces that may be employed include, but are not limited to, known network technology and protocols such as an IEEE 802.11x type network, an IEEE 802.15.x type network, a Bluetooth network, a "Wi-Fi" network, a "ZigBee" type network, an EmberNet ad hoc network (Ember Corporation, Boston, Mass.), a cellular network, a satellite network, as well as to future network technology and protocols.

An RFID device T and/or relay device 30 may also include an indicator, such as a light-emitting diode (LED), an audible device and/or a vibration device, for indicating a condition of the device T, 30, and/or for providing an indication to personnel of some condition or alarm.

Where the device T, 30 is intended to be utilized in a location and/or with an object wherein the environment thereof may be of interest, device T, 30 may include an optional sensor. Examples of such sensors include sensors of environmental conditions, temperature, pressure, position, location, motion, acceleration, impact, distance, inertial information, magnetic field, electrical continuity, altitude, a physical parameter, moisture, humidity, chemicals, medical parameters, biological substances and/or agents, radioactivity, optical, light, infrared, images, electromagnetic fields, and the like, and any combination of any two or more thereof. Such sensors may detect the presence of what is sensed, or may quantify the level or intensity of what is sensed, or both, and may be located external to the container in which the device T, 30 is contained, if necessary for proper operation thereof.

Inclusion of such sensors should be of particular interest in an age of worldwide terrorism because they can provide the ability to sense/detect agents, materials and indicators of the sort that could be used in a weapon of mass destruction (WMD).

RFID device T and relay device 30 may be enclosed in a suitable container, e.g., for physical protection, e.g., against damage, tampering, contaminants and/or the environment. Examples of suitable device containers include containers molded or formed of plastic and engineering plastic materials, and may have human readable and/or machine readable (e.g., bar code) identifying information on the exterior thereof. In addition, the device container may have tabs, brackets, holes, slots, and/or another arrangement for mounting and/or attaching and/or associating the device T, 30 to/with an object. The containers for RFID device T and relay device 30 may be the same or similar, or may be different, and may be sealed or unsealed, all as and if desired.

Where a device T, 30 includes a sensor, the sensor may be located internal to the device container if that location is suitable for sensing what the sensor is to sense (e.g., temperature, motion, acceleration, radioactivity), or may be external to the package or near a port through which the sensor may sense whatever it is intended to sense (e.g., pressure, light, chemicals, biologicals, radioactivity). Suitable sensors include conventional electronic-based sensors, either analog or digital of both, as well as micro-electro-mechanical system (MEMS) sensors, and data provided thereby may be, and typically is, included in the information transmitted by the device T, 30. If movement of air over a sensor is desired, natural air flow or a micro-motion "fan" such as a piezo-electric air mover that consumes only a nominal electrical energy may be employed.

If device T, 30 is likely to be in or come into the presence of radioactivity, then appropriate shielding of the operative elements thereof may be provided, e.g., lead shielding, lead powder impregnated resin, lead filled epoxy shielding, metal shielding, and/or another radiation absorbing material, except that the radioactivity sensing element and the antenna would typically be outside of the shielded portion, although such might be within the container. Such shielding may be for all radioactive particles, or may be for selectively shielding only certain particles, e.g., a shield for alpha and beta particles, but not for gamma rays and/or X-rays where sensing of gamma rays and/or X-rays is of interest. Lead powder impregnated resin and/or lead filled epoxy shielding materials may be formulated so as to permit the passage of electromagnetic waves, and/or to be electrically insulating, while providing effective shielding from radioactive particles.

Similarly, appropriate electromagnetic shielding may be provided in conjunction with appropriate filtering networks for coupling the antenna, e.g., where electromagnetic interference (EMI) is or may be encountered.

Where the device T, 30 is intended to be associated with a human being and/or be inspected by a human being, it may be desirable to provide a signaling and/or display thereon to convey information to and/or receive information from the human being. Examples thereof include a light-emitting diode (LED) and/or other visual indicator, an LCD or other display, an annunciator, speaker, buzzer or other audible device, and/or a vibrator or other tactual device. Such device T, 30 may be employed not only to locate and track a person having the device, but may also be employed to communicate messages to and/or from the person.

In addition, where device T, 30 includes a GPS locator, the location of the device T, 30 at the time an event occurs may be transmitted in the information communicated by device T, 30, as well as the date and time thereof, and/or where device T, 30 includes a sensor, the date and time of a sensed event may likewise be communicated.

Further, each relay device 30 may periodically transmit a signal indicating its presence and/or operability, and/or its location, so that processing computer PC can recognize its presence and operability, as may be desirable from the standpoint of security. Such periodic transmissions need not be frequent, but may be every few hours or once per day or the like. In other words, the lack of any transmission from a relay device 30 could indicate a need for maintenance or repair, or may indicate a security issue if the device 30 is damaged, tampered with and/or missing.

The features in the preceding two paragraphs may also be particularly advantageous where device T, 30 is associated with a mobile object (e.g., package, shipping container, person) or with a mobile area (e.g., ship, vehicle, carrier, conveyance), so that the location of the device T, 30 may be tracked over time.

Figure 4:
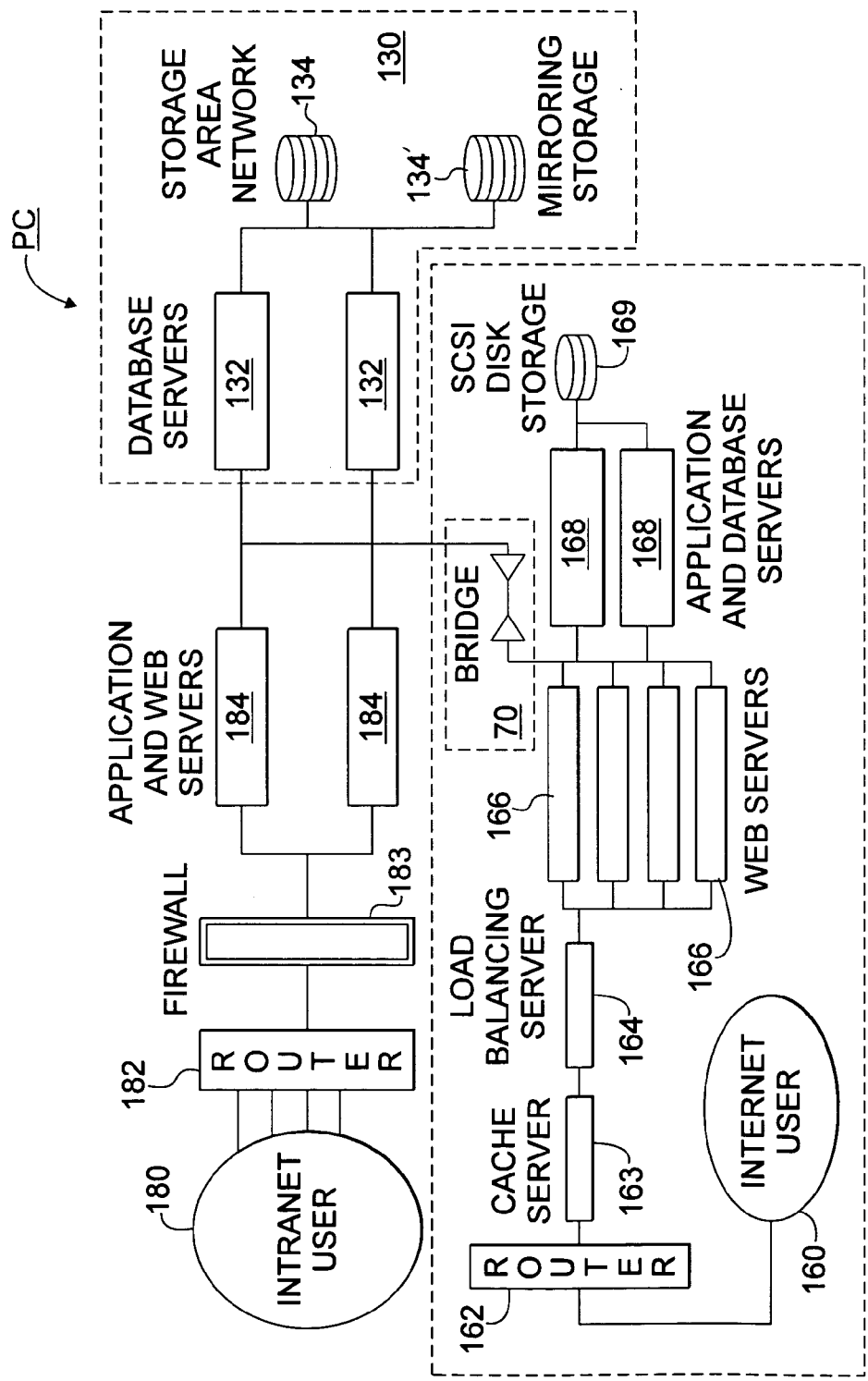
FIG. 4 is a schematic diagram of an example embodiment of apparatus including a communication network suitable for use with the example arrangement and devices of FIGS. 1-3.

FIG. 4 is a schematic diagram of an example embodiment of apparatus including a communication network suitable for use with the example arrangement and devices of FIGS. 1-3.

System 100 may provide communication between processing computer PC and tracking station(s) TS and/or between computer PC and user computers 160, 180, via a communication path including the Internet and/or an Intranet, wherein, e.g., the computer PC may comprise one or more servers 132. A central computer arrangement 130 includes one or more database servers 132 coupled to one or more storage devices 134. Typically, one of the storage devices 134' is located at a different location than is the main or primary storage device 134, so as to provide data backup and protection against such dangers as fire, earthquake, storm, terror attack, and the like. Typically, an Intranet user's computer 180 communicates with the central computer 130 via a local hub and/or router 182 and one or more application and/or web servers 184. Typically and preferably a firewall 183 is provided for protecting computer PC from unauthorized access, from malicious codes and from unauthorized removal of data. Such Intranet may be or include a local hub, a router, an Ethernet, a local area network (LAN), a wide area network (WAN), a wireless network, a cellular network, a satellite network, or any other network.

Typically, such Intranet user 180 may be an official or employee of the agency or entity that locates, tracks and/or monitors RFID tagged objects, or may be an owner, shipper, carrier, recipient or other individual or entity having an interest in the object and/or its location, and so there may be many such users utilizing the system 100 via an Intranet. Alternatively and optionally, some or all of Intranet user computers 180 may have a signature capture device or other identification device and/or a local printer (not shown) associated therewith for controlling access to the servers 130. In addition, users may include government agencies that may have or desire information pertinent thereto, such as security agencies, port and terminal agencies, defense agencies, judicial agencies, corrections agencies, police and investigative agencies that may need or desire information available via computer PC.

An Internet user computer 160 communicates via a router 162, a load balancing server 163, one or more web servers 166 and one or more application and database servers 168. Internet user computers 160 preferably have a signature or other biometric capture device or other identification device and/or a local printer (not shown) associated therewith for controlling access to servers 166, 168. Typically and preferably a firewall is provided (e.g., on cache server 163, balancing server 164 and/or web servers 166) for protecting computer PC from unauthorized access, from malicious codes and from unauthorized removal of data. A separate storage device 169 is provided for accumulating information provided via the Internet by Internet users from computers 160, and such storage device 169 may be local, regional or central. Application and database servers 168 communicate with central computer 130 via bridge 170 and may exchange information between storage devices 134 and 169. Typically, such Internet user may be any of the persons and agencies identified above, as well as individuals seeking to locate an object in which they have an interest, and there may be many such users utilizing the system 100 via the Internet.

It is noted that computer PC may comprise any one or more of the server arrangement 130 and elements thereof, the server arrangement 168, 169 and elements thereof, and/or a separate computer, as may be convenient and desired. Typically, if a tracking station TS is communicating with a computer PC via an Intranet, then an arrangement such as server arrangement 130 or elements thereof might be employed, and if a tracking station TS is communicating with a computer PC via the Internet, then an arrangement such as server arrangement 130 or elements thereof might be employed.

Because the system 100 described preferably includes access via the Internet or another network or communication medium, properly authorized users such as defense, security, intelligence and other agencies, as well as shippers, owners, recipients, and the like, may have essentially immediate access to location and tracking records and/or history at any time authorized. Thus, such persons may have "real time," i.e. essentially immediate, access to the current locating and tracking records in a local, regional and/or central database at any time, whereby real and/or perceived threats may be identified and acted upon appropriately. Alternatively, all or part of the locating and tracking database on computer PC may be loaded onto individual computers, either via the Internet or other network or via floppy disk, CD-ROM or other medium, for use at a site wherein Internet/intranet access is inconvenient or not available.

Suitable software for use with the foregoing includes, for example, the Microsoft SQL Server and IBM "DB2" database software and Microsoft ".NET" (Dot-NET) software framework which facilitates communication between various users and the computers of system 100 and runs with the Microsoft Server-2000 server software, and other database and Internet software that is available from Microsoft Corp., Oracle Corp., Sybase Corp., IBM Corp., and other sources. Various other suitable software is available from different sources known to those of ordinary skill in the art, e.g., for data capture, databases, data retrieval, networking, Internet interfacing, ad hoc networking and the like.

Figure 5:
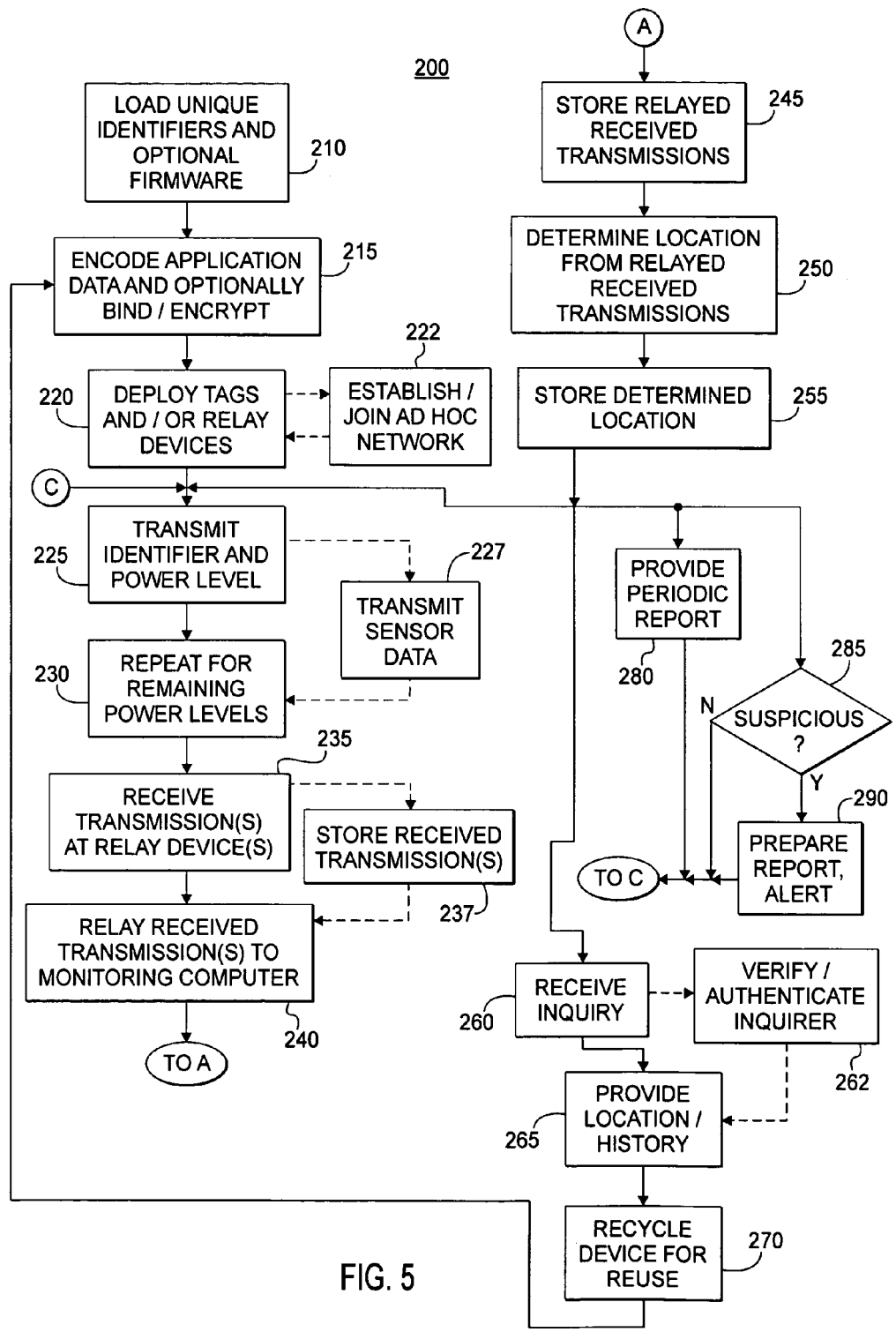
FIG. 5 is a schematic flow diagram of a method for operating the example arrangement of FIGS. 1-4.

FIG. 5 is a schematic flow diagram of a method 200 for operating the example arrangement 100 of FIGS. 1-4. Method 200 commences with the loading 210 of at least one unique identifier into the memory of an RFID device T, 30. Preferably a set of unique identifier codes numbering between two to two-hundred or more unique identifier codes are stored (loaded) 210 into a readable memory, preferably a write-once read-many times memory, of the RFID device T, 30. Preferably this set of unique identifying codes are used internally to the RFID device T, 30 to generate unique identifiers for a series of uses of the RFID device, i.e. so that a single physical device may be reused as many times as there are stored unique codes in the set thereof, and may truly be unique in each use.

Optionally, firmware is also stored for binding, encrypting or other wise protecting the data stored in the memory of the RFID device T, 30 against tampering or copying. The foregoing data is typically stored via a direct electrical connection with the RFID device T, 30, and specifically with the electronic device (chip) thereof, but may be stored by wireless communication via antenna AN.

Preferably, the set of unique identifying codes and firmware are stored in a write-once, read-many ("WORM") memory and are not normally available to be read or otherwise accessed other than in response to a particular command in combination with a password or other security device. Thus, only an authorized person having the necessary command and pass-code information, and usually the necessary electronic device for communicating such information with the device T, 30, can access device T, 30 for changing the unique identifying code thereof.

Data specific to the application (application specific data) is then stored (encoded) 215 in RFID device T, 30 and a unique identifier is retrieved from the set of unique identifiers stored in step 210. If a device is to be utilized as an RFID tag T, then the application specific data may include any one or more of the identification of the object with which it is to be associated, the owner thereof, its origin and destination, its route, date and/or time information, the identity of the shipper and/or of the recipient, a sequence of power levels and/or codes therefor, programming information, and the like. If a device is to be utilized as a relay device 30, then the application specific data may include any one or more of its owner, the identity of the space (e.g., area or volume) in which it is to be deployed, the identity of the moveable item (e.g., container, conveyance, carrier) on which it is to be deployed, its location when deployed (absolutely or relatively or both), its characteristics, programming information, and the like.

Optionally, the application specific data and/or the identifier (unique identifying code) are bound or encrypted to provide a relational check code that is also stored therein, and that will be transmitted as part of the stored data that is read and transmitted. This data is typically stored via a direct electrical connection with the RFID tag T, but may be stored by wireless communication via antenna AN, if desired. The RFID device T, 30 is now ready to be deployed, e.g., as an RFID tag T to be associated with an object to be located and/or tracked, or as a relay device 30 to be deployed to a space 20 for relaying identifying information from RFID tags T to a tracking station TS and computer PC. Where a device T, 30 is to be reused 270, the present unique identifier thereof is preferably deleted or inactivated and the next unique identifier is retrieved from the set of unique identifiers stored in step 210. Thus, means is provide for authenticating each device T, 30 by its unique identifier for each time it is used/reused.

In practice, a plurality of devices T, 30 are processed through steps 210-220 for establishing an array of relay devices 30 and for association with a plurality of objects to be located/tracked. Where a device is deployed as a relay device 30 into a space (e.g., an area or volume) wherein the relay devices 30 establish and maintain an ad hoc network, deploying 220 includes establishing and/or joining 222 an ad hoc network.

Deployed RFID tags T transmit 225 their identifying information (identifier) and preferably a code representing the power level at which the identifier is transmitted. This transmitting step 225 is repeated 230 for each of the power levels at which the RFID tag T is programmed to transmit. Typically, a transmission includes a sequence of transmissions of the identifier and power level code in quick succession, one at each power level in a programmed sequence thereof, e.g., as a burst of signals at various power levels. If the RFID tag T includes a sensor and sensor information is available, the sensor information is added to the unique identifier and optional power level code and is transmitted 227 therewith 225, 230.

Transmitted 225, 227, 230 information is received 235 at whichever of the relay devices 30 that are within transmission range of RFID tag T at the power level at which it is transmitting. Typically the number of relay devices 30 receiving 235 such transmission is greater for transmissions 225-230 at a higher power level and is smaller for transmissions 225-230 at a lower power level.

Each transmission received 235 by a relay device 30 is relayed (retransmitted) 240 to the monitoring computer PC, e.g., via tracking station TS, and each relay device 30 adds to the information it relays 240 information including information identifying the relay device 30 and/or its location, and may also transmit the time at which the relayed information was received. Optionally, the received information is stored 237 in a memory of the relay device, e.g., in a cumulative record of relayed information that may accumulate a large number of such records (i.e. a history) or may accumulate only a limited number of the most recent relayed information, such as on a first-in first-out basis.

Relayed 240 received 235 transmissions received at the monitoring computer PC are stored 245, e.g., in a database thereof, thereby to accumulate 245 a record of all of the receptions of identifying information transmitted by each particular RFID tag T including the locations and/or times at which they were received. This data may be retained if desired or may be discarded after it has been utilized to determine 250 the location of the particular RFID tags T that transmitted the data.

The location of each RFID tag T is determined 250 from the locations and/or times at which its transmitted identifying information was received by a relay device 30, e.g., by "mapping" or calculating the locations corresponding to a particular transmission. Initially, the number of records of locations and/or times at which a particular transmission was received at plural relay devices 30 is determined for selecting the set of locations and/or times that will be utilized for determining 250 the location of the particular RFID tag T. Preferably, the set of records for a location and/or time having the lowest number of related receptions are processed for determining 250 the location of the RFID tag T that transmitted the identifying information. Typically between two and four receptions are represented in this selected set of reception data. The lowest number of plural receptions usually corresponds to the lowest power level at which the transmission was received by plural relay devices, however, it may relate to a transmission that occurred while the RFID tag T was near to a boundary Bo whereat the lack of relay devices may account for the low number of receptions. Relay devices 30 deployed near to a boundary Bo may be identified as such for extrapolating patterns of receptions by such relay devices 30 to attempt to "fill-in missing reception data" with respect to RFID tags T that may be at or near to a boundary Bo.

The determined 250 location and/or time is stored 255 in a database, e.g., of the processing/monitoring computer PC, from where it is preferably accessible 260, 265 both locally and from one or more remote locations via a communication path. Typically the communication path may include any one or more of wire, wireless, cable, telephone, a network, a local area network, a wide area network, the Internet, an intranet, a wireless network, an ad hoc network, a cellular, a satellite, or any combination of two or more thereof.

Typically the foregoing steps 225-255 are repeated so that the locations and times of each of the RFID tags T are updated with the most recent information and so that a history of the locations at which each RFID tag T is at and has been at is accumulated so as to provide in the stored information a history of the movement thereof, e.g., for locating, tracking and/or monitoring purposes. The method described is not affected if and when RFID tags T are removed from or are added to those being located, monitored and/or tracked, because each RFID tag T is located, monitored and/or tracked for as long as it is within any area/volume/space 20 including a relay device 30, even if it should leave one such area/volume/space and enter another, whether immediately or after a delay of any length.

The stored 255 location information may be accessed, e.g., by an inquiry 260 from a local or remote location. An inquiry may be received 260 for information relating to any information that is stored 255 in the database, for example, for information relating to the location and/or history for a particular area/volume/space, a particular RFID tag T and/or a group thereof, a particular relay device and/or a group thereof, a particular date and/or time period, and the like. Upon receipt of the inquiry, the requested information, if available, is provided 265 to the requester, typically via a communication comparable to that via which the inquiry was received 260, although a printed or other tangible report or response may be provided.

Optionally, verification 262 of the requesters identity and/or confirmation of the requester's authorization to receive the requested information may be required prior to providing access or considering an inquiry, and before providing information in response to the inquiry. Typical verification/authentication means include identification and password, biometric identifiers, digital signatures and the like, as may be appropriate.

If a device T, 30 is to be reused 270, it is recycled to step 215 for entry of application specific data and other information relating to the new use. As part thereof, the information and unique identifier relating to the present use is deleted or inactivated so that the physical device T, 30 may be reprogrammed 215 for the new use (reuse). Preferably, a set of unique identifiers is stored in the memory of device T, 30 and the presently utilized unique identifier therefrom may be permanently and irreversibly replaced by another unique identifier of the set of unique identifiers for thereafter uniquely identifying the device T, 30, whereby the device T, 30 may be reused being identified by the another unique identifier.

Following step 260 of storing the determined location, the processing computer may automatically generate one or more reports and/or alerts under predetermined conditions. For example, periodic reports may be provided 280 based on the passage of time, e.g., daily or once per personnel shift, or upon the occurrence of a defined condition, e.g., the arrival of a carrier/conveyance at a port/terminal. In addition, the information stored 255 may be processed to determine 285 whether a "suspicious" event has occurred, e.g., an indication of an opening of or tampering with a container, a lack of reception of transmitted information from an RFID device T, lack of associated information from an associated RFID and/or relay device, and/or a lack of reports of reception thereof by a relay device 30. If a suspicious event is determined 285, then a "Y" results and a report thereof may be prepared 290 and/or an alert or other warning may be provided 290 to the appropriate authority or other entity. Typically, during and at the conclusion thereof, operation continues with the various tags T transmitting 225 identifying information as before.

It is contemplated that among the "objects" with which an RFID tag T are associated are the personnel at each facility, carrier, conveyance and the like so that system 100 operating in accordance with method 200 not only locates, tracks and monitors cargo and other inanimate objects, but also locates, tracks and monitors personnel, thereby to aid in the investigation of tampering, vandalism, theft, and other unusual and/or suspicious activity. Among such personnel are included those who load/unload cargo and the like, those who seal/unseal containers and the like, those who inspect same, drivers and operators, those providing maintenance and repair services, those providing security, and any other personnel desired. In this instance, the reports described above as being provided, e.g., 265, 280, 290, may include reports relating to personnel and/or their association with the object.

An advantageous feature may be provided by the described system and method where RFID tags T are issued to personnel authorized to be in the space or spaces 20 being monitored to perform a desired work or service. RFID tags T for such personnel may be related for monitoring purposes with specific locations and/or with RFID devices T, 30 associated with specific containers, carriers, and the like and/or classes thereof. Such relatedness is preferably made in a record for such RFID devices T, 30 in the database maintained on processor P. In general, any condition wherein two or more related RFID devices T, 30 that are supposed to be proximate each other but are not, or that are not supposed to be proximate but are, or both, may be considered suspicious, e.g., at least to be identified in a notice or other indication to an appropriate entity.

One example of such relationship includes, e.g., that of an inspector with a location at which containers are closed and sealed or are opened and inspected. Thus, when an opening of a container 80 is detected as described herein in a location where containers 80 are opened and an RFID tag T related to an authorized inspector is also determined to be in the same location, the opening of the container may be presumed to be authorized and not to be suspicious. On the other hand, if an inspector RFID tag T is not determined to be present, then the opening may be suspicious. Likewise, if the RFID tag T of an inspector is present in the location when a container 80 is closed, then the closing can be presumed to be authorized and properly inspected.

In any event, the locations, dates, times and conditions relating to objects having an associated RFID device T, 30, are monitored in the manner described herein and so investigation of any detected suspicious activity and/or condition, such as a tampering, opening, and/or theft, whether detected contemporaneously with its occurrence or at a later time, can be facilitated by the information stored in the records of the associated RFID devices T, 30 that are stored the RFID devices T, 30 and/or are stored and accumulated in the database of processor P.

Another example of such relationship includes, e.g., that of a driver or operator with a vehicle that the driver is to operate, wherein either the vehicle or cargo/container carried thereby has an RFID device T, 30 associated therewith. Thus, when movement of the vehicle is detected and an RFID tag T related to an authorized driver is also determined to be in the same location, the movement of the vehicle and its cargo/container may be presumed to be authorized and not to be suspicious. On the other hand, if a driver RFID tag T is not determined to be present, then the movement may be deemed suspicious, e.g., of a theft or highjacking of the vehicle. Likewise, if the RFID tag T of an authorized driver is present when a vehicle and/or its cargo/container is opened, then the opening may be presumed to be proper if the driver is authorized to do so and can be considered suspicious if the driver is not so authorized.

While a "two-way" relatedness has thus far been described, three- or four-way or higher relatedness may be provided, such as among a vehicle, a driver and a container. Separation of the driver and the vehicle and/or of the cargo/container and the vehicle, can be detected by an RFID device 30 on the vehicle from the lack of reception of messages transmitted by the driver's RFID device T and/or the cargo/container RFID device T, 30. Such separation may be considered suspicious if for too long a time or if the vehicle moves while the driver is away, and/or may be utilized to disable the vehicle, either during the driver's absence or permanently if for too long a time.

Further, separation of the driver and the vehicle and of the cargo/container and the vehicle can be detected from the records of the locations of their respective RFID devices T, 30 in the database of processor P and, if for too long a time, may be considered suspicious. Any such detected suspicious, unexpected or out of the ordinary situation may be utilized to trigger a protective or other action, such as enabling real-time monitoring, e.g., including GPS or other locating, disabling the vehicle, and/or notifying a security, police or other entity for their action.

Included in such three- or four-way or higher relatedness may be a covert relay device 30 that is provided, e.g., on a vehicle or a container or both. Such covert relay device 30 may include communication capability to be in substantially continuous communication with the monitoring processor P, e.g., as by cellular and/or satellite communication. While a covert device may be useful, it may be detected by persons who would seek to thwart its function, such as a thief or terrorist, or its use may become known, and so security might also be provided, e.g., as by physical security and/or by periodic transmission of messages so that it can be monitored and tracked.

Indeed, reports may be provided 265, 280, 290, to various parties containing information useful to their function, either in a standard or in a specialized/desired format and timing. For example, reports to an exporter, importer, carrier operator, port operator, terminal operator, independent agency (PIMA), security agency, customs authority, and the like, could all be different in form and content, and may be provided in real time and/or at different times, as desired. Instructions therefor for processor PC may be designated as a management module, a reporting module, or other nomenclature adapted to the need of the agency or entity desiring to receive the provided 265, 280, 290, report or reports.

Although the monitoring function provided by RFID tags T and relay devices 30 is performed substantially in real time, i.e. substantially contemporaneously, periodic message transmission is ordinarily satisfactory. Typically, message transmission is on a regular period wherein the time between transmissions is relatively short relative to the rate at which the tagged objects move or change. However, messages that are triggered by a sensed event or condition may be transmitted substantially contemporaneous with the event if immediate attention may be required, but otherwise may be transmitted with the periodic transmission.

In certain instances it may be satisfactory and/or desirable that a relay device 30 store the information contained in the messages it receives from RFID tags T, thereby to serve as a data recorder, and then to transmit the stored information when subsequently interrogated or polled, e.g., at a later time and/or at a different location. An example thereof would be to be interrogated or polled by a tracking station TS upon arrival at a terminal or port when the relay device 30 comes within communication range thereof. The information stored by relay device 30 may include all the information received, information from a number of the most recent receptions (first in, first out), or information selected from ones of the received messages, e.g., those reporting an unusual and/or abnormal condition and/or event.

Such store for later transmission operation could be advantageous where, e.g., for security reasons, it is desired not to report certain events and/or conditions locally to the relay device 30, but to retain such information for an appropriate authority. Stored information may be protected by a check code, CRC, encryption and/or other protective means when stored and should not be readable except by interrogation/polling apparatus that operates with the appropriate communication and encryption protocols. Suitable encryption could be provided by an MD5 or DES or other encryption algorithm. Where security of the stored information is important, the recording memory/medium could be a write-once-read-many (WORM) memory/medium, an encrypted memory/medium, a redundant memory/medium, or a combination thereof.

Figure 6A:
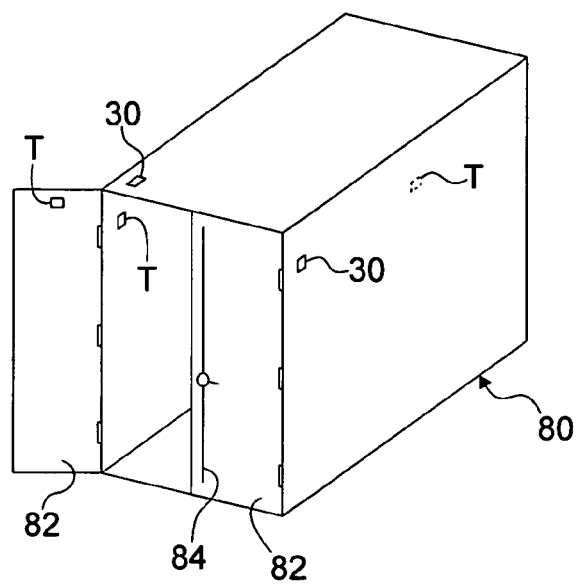
FIGS. 6A and 6B are is schematic diagram of an example arrangement for a relay device employed with a container that contains an RFID tag, optionally for use with the example arrangement of FIGS. 1-5.
Figure 6B:
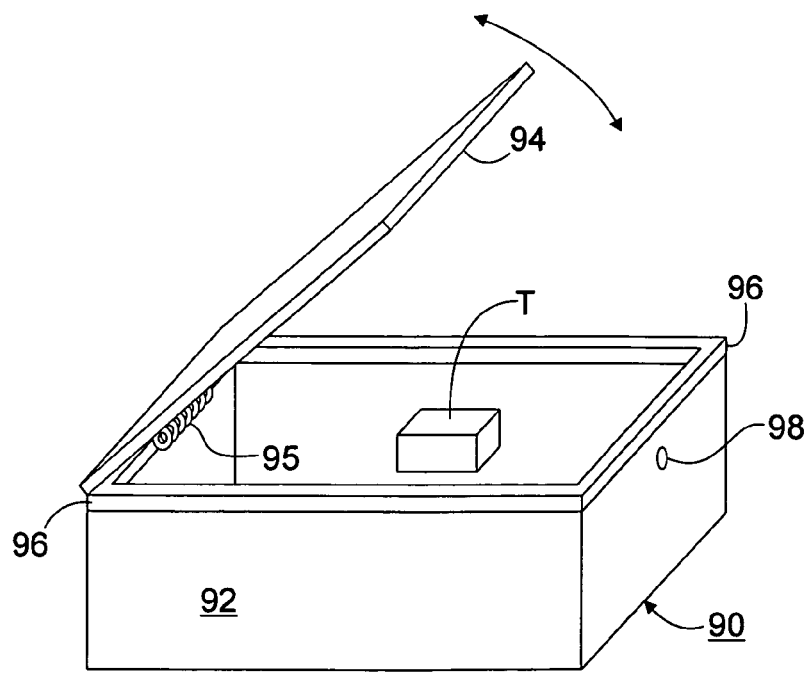

FIGS. 6A and 6B are schematic diagrams of an example arrangement for a relay device 30 employed with a container 80 that contains at least one RFID tag T internal thereto, optionally for use with the example arrangement of FIGS. 1-5. Container 80, which may be a container utilized in inter-modal shipping, such as for containerized cargo transported by any one or more of ship, rail, truck and air, has at least one relay device 30 on an external surface thereof. Relay device 30 may be located at any convenient location on container 80 that is "near" to the door 82 thereof, i.e. is in a location whereat it will receive identifying information transmitted by an RFID tag T that is inside of container 80 when the doors 82 thereof are open. Two possible example locations for relay device 30 are illustrated.

Closable container 80 has one or more doors (closable openings) 82 that may be opened for loading, unloading, and/or inspecting container 80, wherein each door 82 is secured in a closed position by a mechanical latch 84. Conventionally, containers 80 are secured against tampering or theft of the contents thereof by a mechanical lock for maintaining latch 84 in the latched condition with doors 82 closed. Also conventionally, latches 84 are secured by a serialized band, seal or other security device that cannot be opened without leaving evidence thereof, so that any opening or tampering with container 80 will be evident to an inspector. Prevention of tampering and theft have been concerns relating to the integrity of shipments for many years, as well as for customs compliance, and has become a concern of even greater significance since terrorism has become an worldwide issue.

Containers 80 are typically constructed of metal, e.g., steel or aluminum, and so are electrically conductive and provide an electrical shield that substantially attenuates or blocks electromagnetic transmissions from RFID tag T and so prevents such transmissions from being received by relay device 30 exterior to container 80 when the doors 82 thereof are closed. Because periodic transmissions by RFID tag T interior to container 80 will be received by relay device 30 exterior to container 80 only when doors 82 are open, the combination of RFID tag T and relay device 30 detect if and when a door 82 of container 80 is opened. Each receipt of a transmission from RFID device T is stored in a memory of relay device 30 for transmission to a tracking station TS whenever a tracking station TS is identified as being within range of relay device 30, whether by direct transmission or via a network or other communication path.

It is noted that doors 82 do not need to be fully opened to be detected as being open, only that a door 82 be opened sufficiently for the electromagnetic transmission by RFID tag T to reach relay device 30. A preferred RFID tag T described above operates at a relatively high frequency (e.g., 433 MHz or 860-920 MHz or 2.4-2.6 GHz) and so only a small gap between door 82 and container 80 is necessary for its transmission to reach relay device 30. In practice, doors 82 may not be or remain tightly fitted to container 80 and so a gap sufficient to pass the transmission by RFID tag T may occur in the course of moving and handling container 80, which could result in a false indication of an opening of a door 82.

To avoid reliance on the tightness of the seal of doors 82 and to reduce false indications, two RFID tags T interior and two relay devices 30 exterior each container 80 are presently thought to be preferred, however, one tag T and one relay device 30 may be employed with respect to a container 80. This two-tag two-relay device arrangement is preferred because containers 80 are most often not an "ideal" container that is tightly closed when doors 82 are latched 84 so as to effectively block all of the transmissions by an RFID tag T therein. Where two relay devices are utilized, the second relay device 30 may be shared between and/or among two or more containers, so that not every container need have two relay devices 30 associated therewith.

In a typical container 80 and typical handling thereof, it is possible (if not likely) that some transmission from an interior RFID tag T will reach an exterior relay device 30, thereby producing a false indication of an opening of or tampering with that container 80 (a "false positive"). On the other hand, it is also possible (and unlikely) that a slight opening of doors 82 of a container 80 of short duration might not allow a transmission from an interior RFID tag T to reach an exterior relay device 30, e.g., as where goods that tend to block or absorb such transmissions are packed close to RFID tag T, thereby reducing the signal strength of the transmissions from RFID tag T exterior to container 80 and producing a "false negative" (an undetected opening).

Even with only one interior RFID tag T and exterior one relay device 30, false positives and false negatives are both expected to be relatively rare. However, with over 20 million containers entering the United States each year and the threats of terrorism and weapons of mass destruction being very real, even a relatively rare false negative could prove disastrous, and even a relatively rare false positive indication could greatly increase the burden on port authorities to inspect individual containers.

Specifically, two RFID tags T may be disposed interior container 80 in different positions relative to doors 82, e.g., one relatively closer to doors 82 than the other. One RFID tag T may be disposed on an interior side wall of container 80 relatively near to doors 82 and another RFID tag T on an opposite interior sidewall of container 80 much deeper into the interior thereof, perhaps ½ to ⅓ the depth thereof away from doors 82. Further, two relay devices 30 may be disposed exterior container 80 in different positions relative to doors 82, e.g., one relatively closer to doors 82 than the other. One relay device 30 may be disposed on an exterior top wall of container 80 relatively near to doors 82 and another relay device 30 on an exterior sidewall of container 80.

Thus, the transmission paths between each of the RFID tags T and each of the relay devices 30 are different. Because each of the RFID tags T transmit identifying information at N plural power levels, there are 2N different combinations of transmission power levels and transmission paths for each RFID device, or 4N different power levels and transmission paths for the two RFID tags T and two relay devices 30. If tags T each transmit identifying information at four different power levels P1-P4, then there are sixteen different transmitter-receiver-power-level combinations for the two tags T and two relay devices 30. This is four times as many than if one RFID tag T and one relay device 30 are employed, thereby reducing the likelihood of both false positive and false negatives.

With such arrangement it should be possible to reduce the rate of false positives to one in 1,000-10,000, or possibly lower, which is an acceptable rate (and is much less than the present U.S. inspection rate of about 5% of arriving containers and so will not overly burden port authorities). In addition, such arrangement tends to compensate for variations in the power level of transmissions of RFID tags T due to environmental and usage conditions, which could produce corresponding fluctuations in the number of received transmissions that could be mistaken for indications of opening/tampering.

Further, in addition to the basic detection of an opening or tampering by reception of a transmission from an interior RFID tag T by an exterior relay device 30, patterns, e.g., numbers, of the receptions of such transmissions are considered. For example, when a container 80 is closed, even imperfectly, relatively few lower power level transmissions will be received by exterior relay device 30, and a small but higher number of higher power transmissions may be received. However, when a door 82 thereof is opened, a very large number of higher power level transmissions will be received and a significant number of lower power level transmissions will probably be received by exterior relay device 30. This establishes a pattern of the numbers, and of the numbers and power levels, of received transmissions characteristic of a closed container 80 and of an open or partially open container 80.

Actual transmissions from interior RFID tag T received by exterior relay device 30 can be examined for differences therebetween and in comparison with the known characteristics of the container 80 (either a particular container or of a model representing a "typical" container). Thus differences in the number of receptions is expected to provide a more reliable indication of an opening or tampering with container 80, and of the absence thereof, than would a simple "go-no-go" comparison where any received transmissions are deemed to be indicative an opening or tampering of container 80. And differences in the number and power levels of receptions is expected to provide an even more reliable indication of an opening or tampering with container 80, and of the absence thereof.

In case of an indication of a possible opening and/or tampering of a container 80, or of other suspicious condition, the indication thereof is typically and preferably provided to a port authority, a customs authority, a security agency, customs agency, a police agency, a coast guard agency, the military and/or to another responsible and trusted agency, and not to the operator or personnel at the location of the suspect activity, some or all of whom could be complicit or otherwise involved in the suspect activity.

An additional arrangement to avoid reliance on the tightness of the seal of doors 82 and to avoid false indications, or to provide like function to that described above for a container that does not provide electrical shielding, RFID tag T may be disposed in an enclosure 90 within container 80, an example of which is illustrated in FIG. 6B. Example enclosure 90 includes a base 92 and a hinged cover 94 hinged thereto for closing the enclosure 90. RFID tag T is disposed so that it is within enclosure 90 when cover 94 thereof is closed. Preferably, an RF gasket or seal 96 is provided along the lip or edge of container base 92 that contacts cover 94, or is provided on cover 94, so that an RF seal that substantially attenuates electromagnetic transmissions by RFID tag T is provided when cover 94 is closed. Base 92 and cover 94 are of an electrically conductive material and/or are covered with an electrically conductive material so as to provide the desired attenuation.

Cover 94 is arranged so as to be open, e.g., by spring 95, unless it is held closed. Cover 94 is preferably coupled to door 82, e.g., by contact or by a linkage, so that cover 94 will open when door 82 is partially opened, e.g., a small amount. Typically, doors 82 are arranged so that one must be closed first before the other, and so one door 82 must be opened first. Preferably cover 94 is coupled to the door 82 that must be opened first. Because door 82 is usually quite large as compared to cover 94, cover 94 is arranged to open sufficiently to permit transmissions by RFID tag T to pass from container 90 before container door 82 is opened sufficiently to allow an object of significance to be placed into container 80 or removed therefrom without a transmission from RFID tag T being received by relay device 30. Likewise, the time interval between transmissions by RFID tag T are shorter than the time that would be required to open door 82, add or remove an object to or from container 80 and re-close door 82.

While the electromagnetic sealing of an enclosure 90 by cover 94 is more definite and more predictable than is that of a container 80 by doors 82, the method described above including comparing patterns (e.g., numbers, numbers and power levels) of received and not received transmissions between an interior RFID tag T and an exterior relay device 30 is generally preferred, whether one or more interior RFID tags T are employed and whether one or more exterior relay devices 30 are employed. In case of an indication of a possible opening and/or tampering, the indication is typically provided to a port authority, a customs authority, a security agency, customs agency, a police agency, a coast guard agency, the military and/or to another responsible and trusted agency, and not to the operator or personnel at the location of the suspect activity.

One example embodiment of an RF tight enclosure 90 includes a container base 92 of about 3.1 inches wide by about 4.9 inches long and is about 2.2 inches deep, has a cover 94 that is about 3.1 inches wide by about 4.9 inches long, and employs an about 3.1 inch by about 4.9 inch rectangular RF gasket. Enclosure 90 may be of any size and shape suitable for containing a device T, 30. A spring 95 is employed therewith to urge cover 94 toward an open position. Example RFID tag T therein is programmed to transmit identifying information about every 1-3 seconds. Where two RFID tags T are provided interior to container 80, one may be programmed to transmit relatively frequently, e.g., every 1-3 seconds, and the other to transmit less frequently, e.g., every 30 seconds.

In this arrangement, which is considered advantageous for port security, terminal security, airport security and the like, relay device 30 optionally includes a GPS locator so that the location and time of any opening of door 82 may be recorded. Inclusion of a GPS locator is preferred where container 80 is to be transported via a carrier and/or facility lacking a tracking station TS of system 100 with which relay device 30 can communicate for relaying the information indicative of a container opening received from RFID device T. A GPS locator automatically determines location to a high degree of accuracy and relatively frequently, e.g., to within meters and every second or so, from transmissions received from a constellation of satellites orbiting the Earth.

Relay device 30 may also preferably include a networking device for joining a network when container 80 is in or may pass through a location wherein other devices for establishing such network are present for transmitting to a tracking station TS the information stored in relay device 30 that indicates openings of a door 82 thereof, and for assisting in the relaying of messages to and from other devices 30.

Where container 80 is to remain in a location/facility having relay devices 30, e.g., an area 20, or is to always be in one or more such locations/facilities, a relay device 30 on the exterior of container 80 need not be provided and the relay devices 30 of the location/facility as described in relation to FIGS. 1-2, for example, may provide the detection of tampering and other functions as described in relation to FIGS. 6A-6B. Examples include ships having relay devices 30 arrayed at various locations such as in holds, on masts, decks and super structure, and the like, and ports/terminals having relay devices 30 arrayed on cranes, hoists, poles and the like.

It is noted that even if a seal of a container 80 is less than perfect from the standpoint of attenuating information transmissions from an RFID tag T interior the container, a tampering indication may still be provided reliably because the RFID tag T transmits identifying information at a plurality of power levels, e.g., power levels P1-P4. Thus a less than perfect seal might substantially block transmissions at lower power levels, e.g., at power levels P1 and P2, but may pass sufficient of transmissions at higher power levels, e.g., at power levels P3 and P4, so that a "signature" or characteristic of transmissions from the closed container 80 can be obtained.

Deviations from the signature or characteristic condition of the closed container 80 and/or differences between the open and closed container conditions, may be utilized as indications of tampering and/or of opening of container 80, causing the reporting and recording of information transmissions that can be monitored for identifying suspicious activity. Typically, an example RFID tag T may be set to transmit a sequence of identifying information at the plural different power levels every one to five seconds, although a longer period may be employed to increase battery life.

For example, for two RFID tags T interior a container 80 with each RFID tag T transmitting at four power levels P1-P4, then eight transmissions occur each cycle, and so one would expect under ideal conditions that each relay device 30 exterior the container 80 receive 8 transmissions when the container 80 is open and no transmissions when the container 80 is closed (sealed). In a "real world" example, however, 2-3 transmissions might be received when container 80 is "closed" and 6-8 transmissions might be received when container 80 is open, thereby defining a signature or characteristic for that container 80 against which reports of receptions of transmissions by RFID tags T therein can be compared for determining whether a deviation has occurred that is deemed indicative of an unexpected or suspicious "opening" of that container 80 so that an inspection may be performed, if desired.

As a result, not only can an absolute standard in terms of receptions of information from RFID devices T interior container 80 be established for defining when container 80 is open and when it is closed, but an adaptable standard may be utilized wherein differences in the reception of information from RFID devices T interior container 80 may be compared and/or processed for determining whether a container 80 is or has been opened and/or is a suspect or suspicious container 80.

Accordingly, the present arrangement provides the possibility of detecting unauthorized opening or tampering that would not be detected by normal tracking RFID devices and/or with container seals, even RFID seals, and so appropriate authorities may identify and focus their efforts on intercepting and/or inspecting such suspect containers with good cause, and not on a random or other sampling basis that is likely to miss the container or containers that have been tampered with.

An advantage of the foregoing is that any opening or similar tampering of container 80 is "captured" by the relay device 30 (whether on the exterior of a container 80 or associated with a facility or carrier, whether singly or in a network or both) and is forwarded via a tracking station TS, either immediately (i.e. in real time) or subsequently, to the database of processing computer PC. Port security and/or other authorities at an ultimate or intermediate destination may access that database before a carrier and the containers it carries arrive, thereby to be able to identify, intercept and inspect the containers 80 that have been opened or tampered with before they are brought into a port, terminal and/or other location where person or property could be placed at risk. Alternatively, the database of computer PC may be arranged to provide a notification to such authorities and/or others when a report of a received transmission of information from an RFID device T inside a container is received at a time and/or from a location other than a destination at which such opening is planned.

Where RFID tag T includes a sensor, the sensor may be external to enclosure 90 or may be internal thereto. Where appropriate, one or more openings or ports 98 in enclosure 90 may be provided to allow passage of what the sensor is to sense, e.g., a gas, chemical, or biological agent, radioactivity, pressure, moisture, light, and the like. Opening 98 is sufficiently small compared to the wavelength of the transmissions of RFID tag T that the transmissions do not pass through opening 98. If a larger opening 98 is to be provided, an RF shielding screen may be provided in opening 98 to block transmissions from RFID tag T.

Where such sensor is associated with an RFID tag T interior a container 80, the interior environment and/or conditions are monitored thereby from the time the container 80 is sealed until it arrives at a destination and is opened for inspection and/or unloading. Thus, monitoring by the sensor of such RFID tag T is continuous during transit and at all points thereof, and information produced by the sensor may be read and considered at an inspection and/or unloading point as a way to determine whether a hazardous an/or dangerous substance or item is in the container 80. Screening and/or inspection of containers deemed "high risk" is therefor made more thorough and expedient, both at the origin of its travel and at the destinations thereof, as well as at intermediate points, and also furthers the pre-screening thereof prior to their coming to a location where person and/or property may be at risk is the contents thereof are hazardous, e.g., including a WMD or element thereof.

Containers 80 that have been opened or tampered with may be selected for manual inspection based upon the information stored in relay device 30 and retrieved therefrom by a tracking station TS. Specifically, the database of computer processor PC may be employed to determine whether a container 80 has been opened by comparing the database records for the RFID tag T internal to that container 80 with the records of the known location and time of the packing and closing of container 80 and of the known authorized opening of container 80, e.g., for an authorized inspection and/or for unloading.

In addition, where the relay device 30 exterior to container 80 includes an optional GPS locator, relay device 30 may periodically store its location and so its memory will contain a history of the locations at which it has been and the times thereof. These records may be stored in and/or compared to records in the database of processor PC, including records for the carrier of container 80 (e.g., a ship, train, truck, or the like) to determine whether container 80 has traveled over an appointed path or route, or has at some point been diverted to another location or over another path or route. This comparison capability also furthers the likelihood of detecting activity that may be deemed suspicious or is otherwise of interest to security or other personnel, thereby facilitating the identification, interception and/or inspection of suspicious cargo before it enters a port, terminal or city.

RFID devices T and relay devices 30 may include a magnet for facilitating its attachment to a steel shipping container, truck trailer and the like, or may be attached by more robust and/or more permanent means, such as by one or more fasteners and/or adhesive, as may be desired. Where two devices T, 30 are utilized per container or other object, the loss of one does not affect the locating, tracking and monitoring function, and even the loss of both does not necessarily compromise security because a container lacking a device T, 30 could be deemed suspicious and therefore identified and set apart for interception and/or inspection.

Preferably, RFID tags T and/or relay devices 30 employed in the context of shipping and port/terminal security preferably include an optional GPS locator or other location determining device, redundant processors and other electronic circuits and/or batteries, so as to provide a measure of redundancy thereby to increase reliability and reduce the likelihood of failure or other inoperative condition. Also preferably, such relay devices 30 also include an optional ad hoc network communication device so as to be able to interface in a network with systems 100 in various areas and facilities 20, and/or a satellite or other communication means. Where an image sensor is provided in a device T, 30, the communication means may be sufficient to transmit a live, delayed or compressed video signal essentially in real time.

Moreover, information of the sort described above may be accessed and/or available on-line via an intranet and/or via the Internet and/or via any other communication device and path to any authority or other person who may have a need to know or receive such information, or who may have an interest in such information, for a security or other purpose, in real time and/or on a delayed basis. In addition, the processing computer/server PC may provide notifications and/or alerts of any unexpected and/or suspicious event via the intranet and/or Internet, as well as via other communication devices. Communication devices/paths include, e.g., any one or more of wire, cable, telephone, a radio link, a network, the Internet, an intranet, a local area network (LAN), a wide area network (WAN), a wireless network, an ad hoc network, a satellite, e-mail, a computer, a laptop computer, a personal digital assistant device (PDA), a Blackberry-enabled device, a Wi-Fi-enabled device, an EmberNet ad hoc network device, a cell phone, a WAP-enabled cell phone, a pager, and the like. Such monitoring and notification may be provided by computer/processor PC without the need for human action or intervention, and the possibility of error being introduced thereby.

The described arrangement may be employed in conjunction with a relay device 30 that includes an imager as a sensor wherein upon reception by relay device 30 of identifying information transmitted by an RFID tag T interior a container 80, an imager sensor associated with relay device 30 on the exterior of container 80 and/or associated with a relay device 30 nearby thereto may be enabled, and images therefrom may be transmitted to the appropriate port, terminal, government or other security authority.

The described arrangement may be employed in conjunction with conventional container seals, both electronic and physical, as well as in place thereof. Where an RFID device T includes one or more sensors, containers containing such RFID devices T that have not been opened can be opened to read any sensor information from the RFID tag T therein to easily assess whether any dangerous or impermissible condition or material has been detected during the time the container was sealed. In addition, RFID devices T including a sensor may transmit identifying information and sensor information before, as and after a container 80 is loaded, and so an initial or baseline record of the sensor information will be reported and recorded via relay devices 30 at or near to the time of sealing the container 80, so that a container may be cleared as being free of hazardous or dangerous contents at the location of its loading, sealing and departure. Further, containers 80 in international transit having an internal RFID tag T including a sensor may be read during such transit via an exterior or nearby relay device 30 placed specifically to allow monitoring of that container 80.

Containers whose relay device 30 is not functional or is missing can be deemed suspicious and identified for intercept and/or inspection. Seals including a relay device 30 may be provided so that seal and sealing status is reported and recorded in the computer database as such events transpire, e.g., in real time, including reports, alerts and the like to private and/or governmental agencies. Seals including a relay device 30 may be employed in place of, in conjunction with, and/ or in addition to a relay device 30 exterior to a container 80. In addition, relay devices 30 of nearby containers may be close enough to relay messages thereby tending to provide redundancy mitigating the effects of missing or non-functional relay devices 30.

Such ability provided by the described arrangement to enable officials to identify, intercept, isolate and/or inspect suspicious containers prior to their entering a port, terminal, city or other location where they might pose a risk to person or property is especially beneficial in an age of worldwide terrorism. This is because it is essentially impossible (both economically and logistically) to inspect all or a significant portion of the many hundreds of millions of container entries into a port or terminal that occur each year, whether for purposes of customs, verification of contents, or finding a WMD.

Figure 7:
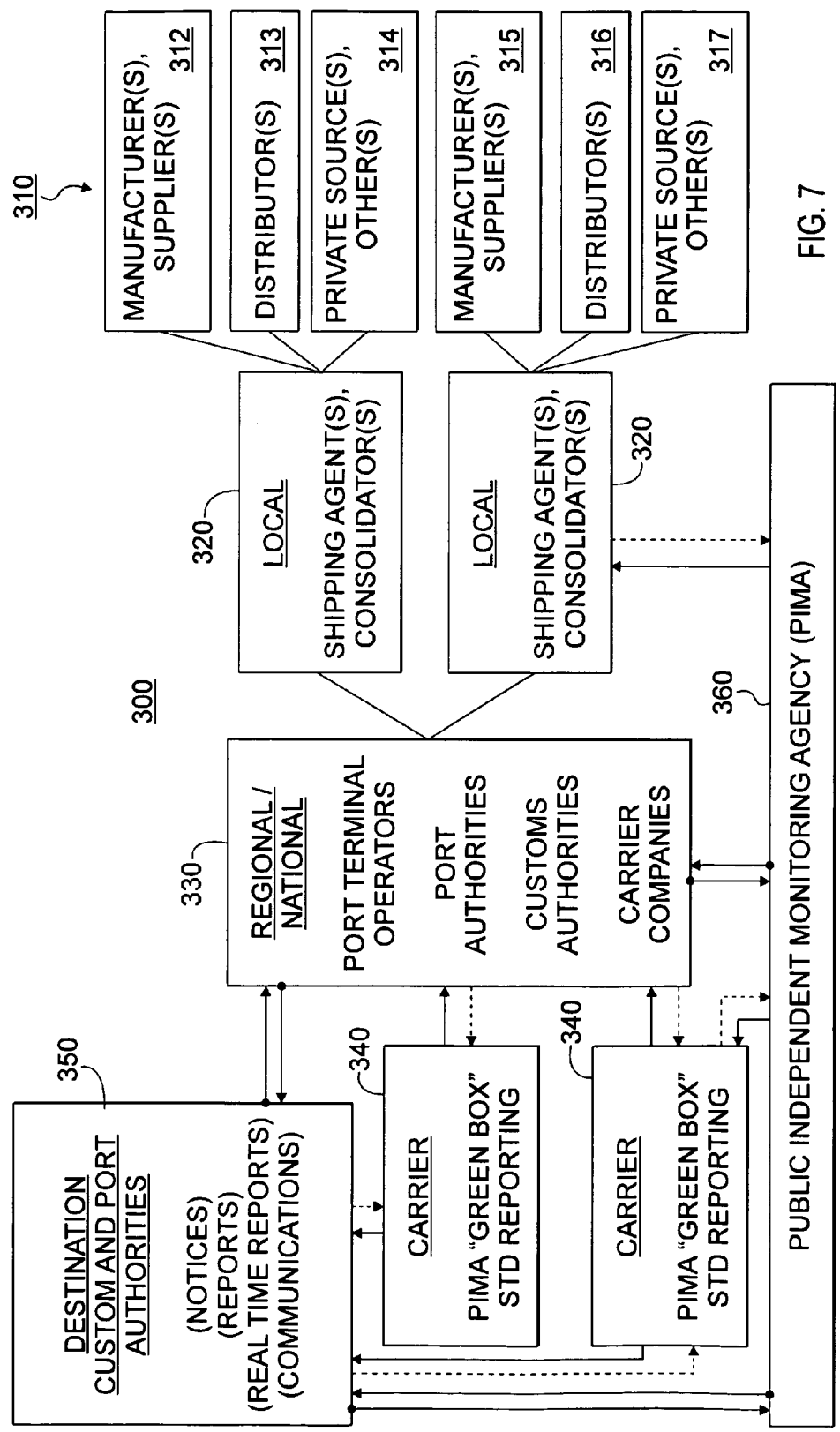
FIG. 7 is a schematic flow diagram of an example method for use with the example arrangement of FIGS. 1-4 and of FIGS. 6A-6B.

FIG. 7 is a schematic flow diagram of an example method 300 for use with the example arrangement of FIGS. 1-4 and of FIGS. 6A-6B. Method 300 provides for the real-time locating, monitoring and tracking of objects having an associated RFID tag T, and is particularly suited for the real-time locating, monitoring and tracking of closable objects having one or more associated RFID tags T interior thereto, as illustrated by the example of FIG. 6A.

In method 300, a local container sealing operation 320 includes the placing of one or more RFID tags T interior a closable container 80, e.g., by a shipping agent or freight consolidator, preferably with verification and/or inspection by an official authority, although such verification may optionally be omitted if the shipping agent or consolidator is a pre-approved or certified entity trusted to inspect and seal containers 80. Local container sealing 320 may also include the placing of one or more relay devices 30 exterior closable container 80, such as by attachment thereto. A relay device 30 may be arranged as a physical seal to the door or other closable opening 82 of container 80; and an optional physical seal (e.g., a mechanical and/or electronic seal) may also be applied thereto.

Also preferably, operation of the RFID tag(s) T and relay device(s) 30 is verified in conjunction with the sealing of the container 80 and a notification thereof and of the loading and departure of container 80 is provided to a trusted third party 360. Typically, a local monitoring apparatus referred to as a "Green Box" is provided at the local sealing 320 location for verifying operation of RFID tags T and relay devices 30 and for providing reports of receipt of information transmitted thereby.

Because local sealing operation 320 may be performed in plural locations by plural entities, plural boxes 320 are illustrated. Local sealing 320 my occur at a port or terminal, or at a warehouse or freight yard from which loaded containers 80 are transported. Each local sealing location 320 would typically provide a network of relay devices 30, whether that is by the relay devices 30 exterior to containers 80, by relay devices 30 associated with the sealing location, or a combination thereof.

An example of a trusted third party 360 may be a public independent monitoring agency or authority ("PIMA") that is established, e.g., typically by governments or agencies thereof, to oversee and monitor security matters. Among agencies that may be involved are military agencies, security agencies, homeland security agencies, customs agencies, transportation agencies, immigration agencies, border patrols, police, and the like. PIMA 360 may be established by agreement, treaty, compact, or any other suitable means, and or could be national, regional, international, or a combination thereof, e.g., a partnership between local and regional/national agencies, however, an international PIMA involving at least those countries that are major producers and/or major receivers of container cargo is believed preferable.

Among the operations of the trusted third party, or PIMA, is the providing and monitoring of RFID devices T, relay devices 30, and "Green Box" apparatus as needed. A Green Box comprises a receiver for receiving transmissions of identifying information by RFID tags T and relay devices 30, and so is similar to a tracking station TS, and a processor, such as processor PC, for storing and processing the received transmissions. Thus a Green Box includes tracking station TS and processor PC apparatus as described above, and is preferably contained in a sealed and physically secure enclosure that is controlled, provided and monitored by the PIMA. Each Green Box preferably includes one or more detectors that detect any breach of the security of the Green Box and communicates a report thereof to the PIMA. Optionally, periodic reports of the operating status and/or of the security of the Green Box may be communicated to the PIMA.

Thus, PIMA 360 ensures and monitors the proper configuration and function, as well as the security, of the Green Boxes. Processor PC of the Green Box stores and provides, e.g., communicates, the received reports to PIMA 360 so that PIMA 360 monitors all RFID tags T and all relay devices 30 at all locations under its jurisdiction. Preferably, suspicious events, e.g., an opening of a container 80 or detection by a sensor associated with an RFID device T, 30, are communicated promptly to the Green Box and are promptly relayed by the Green Box to PIMA 360. Typically, and preferably, such reports are not made available locally or to a carrier for security reasons, since their performance and suspicious activity in their domain is also part of what is monitored and tracked for security purposes, although certain information may be provided as indicated by the broken line arrow.

In transit, containers 80 travel to and through regional and/or national facilities 330, such as those under the control of port operators, terminal operators, port authorities, customs authorities, carrier companies (e.g., shipping, airline, trucking, and railroad companies). Optionally, and preferably, at each location 330, transmissions by RFID devices T, 30 may be received and communicated to PIMA 360 by a Green Box at the location 330, and also are communicated ahead to one or more destinations 350, as indicated by solid arrows. Preferably, regional/national entities 330 are specifically in communication with officials and/or authorities at one or more destinations 350.

In transit, containers 80 travel on vessels, transports and other carriers 340 that are provided by and/or under the control of one or more carrier companies. Carriers 340 preferably each include a Green Box for identifying, monitoring and tracking RFID devices on carrier 340. The Green Box for each carrier 340 provides standard reporting of the RFID devices T, 30, associated with carrier 340, e.g., typically in accordance with a standardized protocol and reporting requirements. Typically, and preferably, such reports are not made available to a carrier 340 for security reasons.

The Green Box on a carrier 340 may or may not be in communication with PIMA 360, however, for those that are, their Green Box typically reports periodically and/or in response to suspicious events to PIMA 360 as above. Typically, and preferably, such reports are not made available to a carrier 340 for security reasons, although certain information may be provided as indicated by the broken line arrow.

As a result of the foregoing, the locations of containers 80, as well as their status and condition, are known, monitored and tracked substantially in real time by PIMA 360 so that any suspicious event or occurrence may be communicated ahead to destination 350 so that action may be initiated preferably before the carrier 340 transporting a suspect container 80 arrives at destination 350. For example, if an opening of or other anomalous condition for a container 80 is detected by a relay device 30 exterior thereto, that detection event is communicated by relay device 30 to a Green Box and thence to PIMA 360 and to destination 350 so that appropriate steps may be taken prior to arrival of container 80.

In the context of preventing terrorism, for example, a sensor associated with an RFID device T interior a container may detect a biological agent, a chemical agent, and/or radioactivity, and that is communicated via relay device 30 and a Green Box to PIMA 360 and to destination authority 350 who can intercept and/or divert the carrier 340 for investigation of the suspicious sensed condition before the suspect container 80 arrives or is brought into a terminal, port, or other location that is near to a populated area.

At destination 350, official agencies, such as customs and port authorities, police and military agencies, and the like, receive reports from Green Boxes associated with the carriers 340, regional/national facilities 330, and local sealing facilities 320 either directly, through PIMA 360, or both. Such reports may include ordinary shipping documentation as well as notices of suspicious and/or unusual events. Examples include: notices, manifests and shipper declarations from authorities at various departure locations 320, 330, pre-arrival notices from carriers 340, pre-arrival negative reports from monitoring agency 360 that no tampering or other suspicious event and/or condition has been detected and/or sensed. Such reports also include substantially immediate reports, and real-time reports, and/or monitoring upon the detection and/or sensing of any tampering or other suspicious and/or unusual event and/or condition for any container 80, as well as reports of any action taken by another authority in relation to any of the foregoing.

In addition, destination port, customs, security and other authorities 350 are preferably in communication with port, customs, security and other authorities at departure locations 330, 320, and may also be in communication with carriers 340 and carrier companies as appropriate.

Optionally, where circumstances, law and/or policy permit, RFID devices T may be placed interior to containers 80 and/or relay devices 30 may be placed exterior to containers 80 prior to their arrival at a local sealing facility 320. Examples of locations and/or facilities 310 where such placement of RFID devices T, 30 may occur include manufacturers, 312, 315, suppliers 312, 315, distributors 313, 318, and others 314, 317 such as private sources and other persons and entities that have been cleared and approved to place RFID devices T, 30. Such placement by trusted entities 310 enables the monitoring f the condition of containers 80 from the time they are packed and/or loaded at the trusted entity 310 which is earlier in time and in the transport path than if RFID devices T, 30 are placed at a local sealing facility 320. Even in such instance, it is preferred that the sealing facility 320 obtain identifying and monitoring information transmitted by RFID devices T, 30 prior to sealing container 800, and preferably also inspect container 80, prior to sealing container 80.

In the described system and method, reporting of exceptions and tampering events is typically provided first to port, security and/or customs authorities at a destination, and next to an independent agency (e.g., PIMA), if any, and to other parties that may have a need-to-know such information. Authorities at the destination determine when and whether to communicate information to persons and/or authorities at the originating location and/or any intermediate locations, to security and/or other personnel on the carrier or conveyance, and/or to other persons such as a shipper, recipient, owner or other party in interest. Usually, personnel onboard the carrier or conveyance, or at a location where tampering or unauthorized opening occurred, would not be made aware of a reported tampering or other suspicious event so that secrecy is preserved and so that there is a greater likelihood of identifying those involved.

The system and method described herein helps to accomplish the ends of the U.S. Container Security Initiative (CSI) of which core elements thereof include:

Using intelligence and automated information to identify and target high-risk containers;

Pre-screening those containers identified as high-risk at the port of departure, before they arrive at U.S. ports;

Using detection technology to quickly pre-screen high-risk containers; and

Using smarter, tamper evident containers.

In addition, the described system and method may be utilized in relation to content monitoring, inland transit monitoring, terminal and port monitoring, and the like. In practice, a governmental agency or independent agency, such as a third party Public Independent Monitoring Agency (PIMA) may be established for issuing and monitoring RFID devices T, relay devices 30, and other elements of the described system, for providing any necessary certifications, and for establishing the appropriate infrastructure, e.g., tracking stations, communication links, and processing computers PS, whether separate or networked based servers, and for providing reports, alerts, warnings, and other messages for interested parties and agencies.

It is anticipated that relay devices 30 may be spaced apart about 40 meters for use in ship-board or port/terminal areas where RFID tags T transmitting at 433 MHz are utilized, and so the cost of outfitting such ship or port/terminal, including a tracking station TS and local computer PC is expected to be less than for conventional locating systems. In addition, because tags T are reusable, the cost therefor per use, even including the cost of battery replacement, is expected to also be very reasonable. Indeed, the potential benefits of 100% tracking information being continuously available in real time and the ability to isolate and intercept suspicious cargo, and the benefit of reduced losses due to theft and inventory shrinkage, appear to far outweigh the cost. Each and every tagged object may be located, tracked and monitored as it moves from its origin location to its destination.

Further, any known or future arrangement/method for avoiding and/or reducing "collisions" and/or interference between transmissions may be employed, as may any other suitable scheme therefor. These so-called "anti-collision" arrangements/methods may include, for example, responding only to certain predetermined codes and/or groups of codes, responding in an a priori sequence, responding by geographic zone, prioritizing which tags transmit and/or receive and/or when, a time delay between interrogation and response, a randomized or variable time delay therebetween, use of different frequencies and/or channels, TDMA, CDMA, spread spectrum, and other arrangements, and may include those specified in the ISO 18000-1 through −7 standards, in the ISO 18185 standard relating to smart seals for containers, and any combination of any of the foregoing.

An anti-collision scheme employing partial a priori knowledge includes the numbering or indexing of the RFID device T, 30 identification numbers. Example schemes include utilizing part of the RFID device identification numbering as an initial interrogating or polling query to segment the number of possible RFID devices that respond, such as alternately interrogating/polling devices beginning and/or ending in even and odd numbers, sequentially interrogating/polling devices beginning and/or ending in characters from "A" to "Z", sequentially interrogating/polling devices beginning and/or ending in permutations of alphabetic, of numeric and of alpha-numeric characters, and the like. In such arrangement, the RFID devices are programmed to respond only when the appropriate interrogation inquiry is received and then to not respond, e.g., for a predetermined period of time, and the response characteristics of the RFID devices may be programmable by commands/control signals from an interrogation/polling device.

For example, sequenced interrogation/polling using the last two numeric digits typically reduces the number of RFID devices responding by about $1/100$, while sequenced interrogation/polling using the last two alpha-numeric characters typically reduces the number of devices responding by about $1/1296$, whereby the number of responses by aggregations of 10,000 or more RFID devices is reduced to a number that can reasonably be handled by conventional time-domain, frequency-domain, and code-division multiplexing, or by a combination thereof. If additional digits or characters, e.g., three characters instead of two, are included in the polling sequence group, then a correspondingly greater reduction in the number of RFID devices responding is achieved.

Once the identification numbers of the RFID devices present are determined by the foregoing interrogation/polling method, then the individual RFID devices, or groups of RFID devices of manageable number, are polled or communicated with to obtain the information stored therein, e.g., such as individually, sequentially in time, sequentially in groups, and the like, consistent with the conventional anti-collision scheme employed. Even if the RFID devices present change between the time of the initial polling and the completion of obtaining the information transmitted by all of the RFID devices present, i.e. some RFID devices leave and others arrive, little information is lost because the time required for a complete polling and information download is substantially less than the time that would be required to remove and/or add a significant number of RFID devices. RFID devices that arrive during polling may be polled at the conclusion of the ordered or sequenced polling.

Another anti-collision scheme employing accumulated a priori knowledge includes reading the identifiers of the RFID devices T as they are sequentially placed in the reading region of a reader device 30 so that their identifying information can be received and stored, e.g., recorded in a database. RFID tags T may be placed within the reading region of a reader 30 individually, in groups within the reading capability of the reading device 30 without collision, or both. An example thereof is reading the RFID devices T as they arrive in the area 20 thereby to accumulate over a period of time a record of all of the RFID devices T present, i.e. a first-in-first-read approach. Because the rate at which RFID devices can arrive is limited, the number of RFID devices to be read at any time should remain within what the relay devices 30, tracking station TS and processor PC can handle.

Once the identifiers of the RFID tags T within the area 20 have been read and stored, subsequent polling could be by individual identifiers or by groups of identifiers, thereby to reduce the probability of collisions. In addition, subsequent polling could employ other RFID protocols, such as time-domain, frequency-domain, code-division or other multiplexing method, or a combination thereof. After the RFID devices T known to be present are polled, polling may continue to identify other RFID devices T that have come into area 20. A response from the device T indicates that it is still present in the area 20; lack of response from any particular RFID device T upon subsequent polling most likely indicates that the object associated with the device and the device have left the area 20 (or possibly that the RFID device T is inoperative).

Further, where it may be desired to identify RFID devices T that are already in an area 20, additional steps are needed so that the reading area of the relay device 30 may be reduced or segmented. For passive RFID tags T, the number of devices T interrogated may be reduced by reducing the power level of the interrogation signal transmitted by relay devices 30 until the number of devices T responding is within the capability of the reader(s) without collision problems, by reducing the sensitivity of the receiver of relay device 30, or both, and then using the responses therefrom to generate a listing (database) of the identities of the devices T present. Such database listing then becomes like and may be utilized as "a priori" knowledge of the devices T present, and then proceeding with polling as described above.

In the case of active RFID devices T, the active devices T can be commanded to respond by transmitting at their lowest power level thereby reducing the number of transmissions that can be received by the relay devices 30., i.e. only the relay device or devices 30 closest to an RFID device T will receive the information transmitted thereby. The responses from the active RFID devices T may be utilized to generate a listing (database) of the identities of the devices T present. Such database listing then becomes like and may be utilized as "a priori" knowledge of the devices T present, and then proceeding with polling as described above. The foregoing may be employed in addition to the steps described above in relation to the relay devices 30.

The system and method described herein may be utilized in a wide variety of applications, environments and locations. For example, it may be applied as a locating system and method, as a tracking system and method, as a monitoring system and method, for inventory management, for supply chain management, livestock management, feedlot monitoring, and the like, in each instance for real-time or historical recording or both. The system and method may also be applied in relation to a show, event, convention, conclave or other gathering, e.g., for locating, tracking and/or monitoring, visitors, attendees, participants, exhibitors, performers, and other people thereat, for the management thereof, the organizer thereof, for the exhibitors, for the attendees, and/or for others. It may also be employed in a school, amusement park, stadium, or other education and/or entertainment venue, and the like, for tracking and/or monitoring students, participants, visitors, guests and/or staff.

Other applications can include monitoring of prisoners, inmates, other incarcerated persons, committed persons, other confined persons and staff in a prison, jail, mental health facility and/or other facility, and/or outside thereof, e.g., under house arrest, a restraining order, probation monitoring, parole monitoring, sex offender monitoring, or other restriction. Other applications include monitoring patients, infants, medical and other staff, and/or equipment in a hospital, nursing, mental health or other care giving facility. In such applications it may be desirable to provide "tamper-proof" and/or "tamper-resistant" RFID devices whereby tampering is made more difficult or almost impossible without faulting the operation of the RFID device. One example thereof, in addition to physical enhancement, would include an electrical conductor in the band or bracelet or other attachment to the person or object so that tampering would break, and/or an attempt thereat would likely break, the electrical continuity of the electrical conductor (e.g., as a sensor associated with the RFID device) thereby to cause the RFID device to transmit a message indicating that condition.

An advantageous benefit is that it may be employed in certain of the foregoing in an emergency, e.g., a fire, for locating persons needing to be rescued, to be assisted to escape or to otherwise exit safely.

RFID device T, 30 may be provided with an optional user interface UI for communicating information to a user or carrier thereof, as illustrated in FIG. 3. User interface UI may be as simple as a visual indicator (e.g., one or more LEDs) to indicate that the RFID device is operative or is transmitting, or it may be more complex, such as a display (e.g., an LCD, alpha-numeric and/or image display) or an annunciator (e.g., a buzzer, vibration device, speaker, and/or voice synthesizer) for communicating messages to a human user. In addition, RFID device T, 30 may include an input device, e.g., one or more pushbuttons, whereby a user may input information for communication via the RFID device T, 30, e.g., an emergency, call-for-help or "panic" button. User interface UI may be utilized to indicate a condition, e.g., a detection by a sensor, or a message relating to the RFID device or the object with which it is associated, that is read by a human in real time or at a subsequent time. In the context of a show, convention or other event, a message (e.g., an announcement or reminder) could be communicated to all or individual or groups of attendees, exhibitors, and others having one of the RFID devices.

With regard to vision impaired people, the location of the RFID tag T determined by the processing computer could be transmitted to the tag T and announced (e.g., by tones and/or synthesized voice) thereby to alert the vision-impaired user of his location or of a danger or other condition. Moreover, because the RFID tag T transmits at different power levels, proximity to a location can be determined to help guide the person there. For example, a relay device 30 at a bus stop could be employed to indicate/announce that one is approaching the bus stop and/or a relay device 30 on a bus could be employed to cause the user's RFID tag T to indicate/announce that the bus is approaching.

In addition, because the RFID tag T transmits at different identified power levels and the relay device 30 receives the transmitted information including the power level, the relay device may be employed to initiate or permit or control certain functions responsive to the identification information and power level transmitted. For example, as a computer access control or other security device, relay device 30 may be connected to a USB port or other computer port for enabling the computer to be operated/used by a person having a particular RFID tag T in his possession near to the computer. Access may be granted based on the proximity of the RFID tag T alone or in combination with one or more additional access controls, such as a user ID, password, biometric identifier, and the like. Terminating access may be based upon absence of the RFID tag T, absence of RFID tag T information at a certain power level, and/or absence of the RFID tag T for a predetermined time. For example, once accessed, the computer may remain enabled when information transmitted by RFID tag T at low power level P1 is received by the relay device 30 connected to the computer, may present a blank screen if information is received at intermediate power level P2 but not at low power level P1, and may log the user off if information is not received at power levels P1 and P2.

As used herein, the term "monitor" means to watch, to observe, to check, to keep under observation and/or surveillance, to locate, to keep track of, to determine a status and/or condition, to record a status and/or condition, to detect an operation and/or condition, to oversee, to manage, to supervise, to regulate, to control, to test, and the like, either once or more than once. Watching and observing, for example, do not necessarily imply visual contact. Thus, monitoring can include locating and tracking. Tracking can include locating at different times and/or over a period of time, and may comprise plural locatings, plural monitorings, and/or an indication of a path, movement or progress.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such.

It is noted that while the various identifiers and relational check numbers are referred to as "numbers," each may include numerical, alphabetic, alpha-numeric and other characters and symbols, conventional or arbitrary, as may be desired. Information is typically represented and/or stored in a memory in accordance with a predetermined formula or algorithm or other scheme, either on a character by character basis or on the basis of one or more combinations of the characters or values, for example, binary, binary coded decimal, hexadecimal, or any other digital coding representation thereof. The parity or check number or code is likewise representative of the information represented or stored in the memory in accordance with a predetermined formula or algorithm or other scheme, either on a character by character basis or on the basis of one or more combinations of the characters or values stored in the memory. Suitable formula and algorithms therefor include, for example, binary, binary coded decimal, other digital coding representations thereof, parity checks or other parity representations, sum checks, field relationship checks or any other predetermined relationship between the stored data or information and the parity or check number or code.

The present arrangement can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the process or processes. Storage media for containing such computer program include, for example, floppy disks and diskettes, compact disks (CD), CD-ROMs (whether or not writeable), DVD digital disks, RAM and ROM memories, computer hard drives and back-up drives, and any other storage medium readable by a computer. The process or processes can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the process or processes. The process or processes may be implemented on a general purpose microprocessor or on a digital processor specifically configured to practice the process or processes. When a general-purpose microprocessor is employed, the computer program code configures the circuitry of the microprocessor to create specific logic circuit arrangements.

While the present invention has been described in terms of the foregoing example embodiments, variations within the scope and spirit of the present invention as defined by the claims following will be apparent to those skilled in the art. For example, the frequencies at which RFID tags T and/or relay devices 30 receive and/or transmit may or may not be the same, and/or may be in the same or in different frequency bands, as may be convenient in a particular application or regulatory environment. This may involve each device T, 30 including plural devices to provide the desired transmission and receiving characteristics, and an RFID device may be an active device, as is thought preferable, or a passive device.

The term "space" is used herein to mean any volume, area, line, and/or location wherein one or more relay devices are or may be placed and/or wherein one or more RFID devices may be, may enter, may leave and/or may pass through. While a date and time of an event may be provided by a GPS locator or by a clock/timer associated with a device T, 30, date and time information may be provided by any element of the system, including but not limited to any computer and/or server, any network element, and/or any other item that keeps or has date and time information.

Any of the RFID devices T, relay devices 30, tracking stations TS, communication devices, and/or processing computers/servers PC may be enclosed in an enclosure, container, package, and/or facility for providing physical security and/or indicating tampering and attempts thereat. Such enclosure, etc. would typically be hardened and locked against unauthorized entry/access, and in some instances, such as a foreign port or origin, or aboard a carrier, is typically the preferred arrangement.

Power level codes or other power level information in messages transmitted by RFID devices T, 30, may be any numeric, alphabetic, alphanumeric, or other character or symbol that can be used to represent or indicate a relative level of power, and need not represent an actual power level. It is sufficient that the relative power levels be represented, e.g., either higher or lower, as the case may be. Thus, for example, a set or sequence of codes, such as a 1, 2, 3, . . . , or a, b, c, . . . , sequence, representing increasing relative levels of transmitter power is sufficient, as in the example designators P1, P2, P3, P4 in the description herein, as would a sequence of decreasing power levels or a sequence wherein power levels increase and decrease. In other words, the order of the messages at transmitted at different power levels in not important, just that messages are transmitted at different identifiable power levels.

Clearances and/or other status indications may be issued by any person, agency and/or other entity involved at any point in the system and method. Typically a governmental authority or other trusted entity at a point of origin and/or at a key shipping or transit location might provide a certification that a container had been loaded according to its manifest and was properly sealed with devices T, 30 in place and operating. Moreover, the described arrangement may be used with, in addition to and/or in place of other locating and/or monitoring systems and/or sealing devices.

As used herein, radio frequency refers to any frequency at which an electromagnetic signal may be transmitted from one location to another through a vacuum, air or other gas or fluid, a liquid and/or a solid. As used herein, tag refers to any arrangement for associating a radio frequency transmitter with an object of any kind. Typical examples of a tag could include a substrate or housing for supporting a radio frequency transmitter and for being attached or affixed or coupled to an object of any kind. As used herein, an object may include any object or article or person or animal of any kind. Typical examples of objects include products, stock, inventory, packages, containers, pallets, trailers, trucks, vehicles, livestock, people, passengers, customers, employees, and the like, and any combination of any two or more thereof.

Numerical values stated are typical or example values, and are not limiting values. While a given number of RFID devices T and/or relay devices 30 may be described as being utilized, it is contemplated that other numbers of such devices may be employed in any given usage. For example, while two or more RFID devices T are preferred to be placed interior to a container 80 and two or more relay devices 30 are preferred to be placed on the exterior thereof, one RFID device T or three RFID devices T could be utilized, and/or one relay device 30 or three relay devices 30 could be utilized. Depending upon whether a false positive indication, a false negative indication, or no indication is deemed to be more undesirable, the lack of agreement between the two relay devices 30, or the lack of reception from one or from both RFID devices T may be deemed a more serious condition for purposes of defining an event to be reported to an appropriate authority or other entity. Because the RFID devices T are inside a container and the opening of the container is reported virtually immediately, the likelihood of an "insider" being able to tamper with or to add or remove an item from a container without being detected is reduced to a very small, almost zero, possibility.

Each of the U.S. Provisional Applications and U.S. Patent Applications identified herein are hereby incorporated herein by reference in their entirety. It is noted that the term "Zoner" as used therein generally refers to RFID device or tag T herein and that the terms "Relayer" and "Relay-reader" as used therein generally refer to relay device 30 herein.

What is claimed is:

1. A method for monitoring one or more objects each having an RFID device associated therewith, said method comprising:
   transmitting at least two messages at different respective power levels from the RFID device, wherein each of the at least two messages includes information uniquely identifying the RFID device and information representing the power level at which the message is transmitted;
   relaying the at least two messages transmitted by each RFID device to a processor; and
   processing the relayed messages for determining the location of each RFID device, said processing comprising:
      processing the unique identifying information and the power level information from each relayed message for associating the relayed messages from each RFID device and the power level thereof, and
      selecting the relayed messages from a particular RFID device that are at the lowest power level that produces at least two corresponding relayed messages for determining the location of that particular RFID device and its associated object therefrom.

2. The method of claim 1 wherein said relaying further comprises associating identification information, or location information, or date/time information, or any combination of the foregoing, with the messages relayed.

3. The method of claim 2 wherein said processing the relayed messages further includes processing the identification information, or the location information, or the date/time information, or any combination of the foregoing, for determining the location of a particular RFID device.

4. The method of claim 1 wherein said transmitting at least two messages comprises transmitting continuously, or transmitting messages periodically at regular or irregular intervals of time, or transmitting messages at programmable intervals, or transmitting messages at programmable power levels, or transmitting messages responsive to an interrogation signal, or transmitting messages until receipt of an acknowledgment signal, or any combination of the foregoing.

5. The method of claim 1 wherein said selecting the relayed messages further comprises:
   defining a radius value representative of the power level of each relayed message; and
   for each RFID device, determining the intersection of respective geometric shapes having the defined radius values for locating that particular RFID device in the intersection.

6. The method of claim 5 wherein said selecting the relayed messages further comprises:
   if the respective geometric shapes having the defined radius values do not intersect, then proportionately increasing the radius values thereof until the respective geometric shapes do intersect.

7. The method of claim 5 wherein said determining the intersection of respective geometric shapes having the defined radius values comprises:
   determining the intersection of first and second ones of the respective geometric shapes having defined radius values;
   determining the intersection of a third one of the respective geometric shapes having defined radius value with the intersection of the first and second ones thereof; and
   repeating the immediately preceding determining step for each additional one of the respective geometric shapes, if any, until all of the respective geometric shapes for the particular RFID device are used.

8. The method of claim 1 wherein said processing the relayed messages comprises storing in records in a database at least the information contained in the relayed messages and the location information determined for each RFID device from which a relayed message has been received, said method further comprising:
   accessing information stored in records of the database via wire, or cable, or telephone, or a radio link, or a network, or the Internet, or an intranet, or a local area network, or a wide area network, or a wireless network, or an ad hoc network, or a satellite, or e-mail, or a computer, or a laptop computer, or a personal digital assistant device, or a Blackberry-enabled device, or a Wi-Fi-enabled device, or a cell phone, or a WAP-enabled cell phone, or a pager, or any combination of the foregoing.

9. A method for monitoring an object having at least one RFID device interior thereto, said method comprising:
   periodically transmitting at least two messages at different respective power levels from at least one RFID device interior to a closable object;
   wherein each of the at least two messages includes information uniquely identifying the RFID device and information representing the power level at which the message is transmitted, and
   wherein ones of the periodic messages that are transmitted when the closable object is closed are substantially attenuated by the closable object, and wherein ones of the periodic messages that are transmitted when the closable object is not closed are not substantially attenuated by the closable object;
   relaying the received ones of the at least two messages transmitted periodically by each RFID device via at least one relay device exterior the closable object, wherein at least some of the substantially attenuated messages are not received by the relay device; and
   processing the relayed messages for determining the location of each RFID device, said processing comprising:
      processing the unique identifying information and the power level information from each relayed message for associating the messages from each RFID device and the power level thereof, and
      selecting the messages from a particular RFID device at the lowest power level that produces at least two corresponding relayed messages for determining the location of that particular RFID device therefrom, whereby a particular RFID device and its associated object are monitored.

10. The method of claim 9:
    wherein said relaying further comprises associating identification information, or location information, or date/time information, or any combination of the foregoing, with the messages relayed; and
    wherein said processing the relayed messages further includes processing the identification information, or the location information, or the date/time information, or any combination of the foregoing, for determining the location of a particular RFID device.

11. The method of claim 9 wherein said selecting the relayed messages further comprises:
    defining a radius value representative of the power level of each relayed message; and
    for each RFID device, determining the intersection of respective geometric shapes having the defined radius values for locating that particular RFID device in the intersection.

12. The method of claim 11 wherein said selecting the relayed messages further comprises:
    if the respective geometric shapes having the defined radius values do not intersect, then proportionately increasing the radius values thereof until the respective geometric shapes do intersect.

13. The method of claim 9 wherein said processing the relayed messages further comprises storing in records in a database at least the information contained in the relayed messages and the location information determined for each RFID device from which a relayed message has been received, and further comprising:
   locating each RFID device from information contained in the most recent record for that RFID device that is stored in the database; or
   tracking each RFID device from information contained in the accumulated records for that RFID device that are stored in the database; or
   monitoring each RFID device from information contained in at least selected ones of the records for that RFID device that are stored in the database; or
   providing an indication of an opening of an object associated with an RFID device from information contained in the record or records for that RFID device that are stored in the database; or
   any combination of the foregoing.

14. The method of claim 13 further comprising, in addition to providing a given RFID device interior a given closable object, relating a second object RFID device associated with a second object to the given closable object by a predetermined relationship, and storing in the database information relating the given RFID device interior the given closable object and the second object RFID device related thereto.

15. The method of claim 14 wherein the predetermined relationship includes proximity of the second object and the given closable object, or absence of proximity of the second object and the given closable object, or both, and further comprising providing an indication of whether the second object and the given closable object are in the predetermined relationship.

16. The method of claim 9 wherein said relaying further comprises:
    establishing an ad hoc network for communicating the messages transmitted by RFID devices for said processing at least two messages.

17. The method of claim 9 wherein the unique identifying information of the RFID device includes a set of a plurality of unique identifiers, one of which unique identifiers is presently included in messages for uniquely identifying the RFID device, said method further comprising:
    permanently and irreversibly replacing the presently utilized one of the set of unique identifiers by another unique identifier of the set of unique identifiers for thereafter uniquely identifying the RFID device, whereby the RFID device may be identified by the another unique identifier for reuse.

18. A method for monitoring a container having at least one RFID device interior thereto, said method comprising:
    providing an RFID device interior to a closable container, the RFID device periodically transmitting messages;
    wherein each of the messages includes information uniquely identifying the RFID device, and
    wherein ones of the messages that are transmitted when the closable container is closed are substantially attenuated by the closable container, and wherein ones of the messages that are transmitted when the closable container is not closed are not substantially attenuated by the closable container;
    receiving messages transmitted by the RFID device interior the closable container by a receiving device exterior the closable container;
    whereby ones of the messages that are transmitted when the closable container is closed are not received by the receiving device, and wherein ones of the messages that are transmitted when the closable container is not closed are received by the receiving device;
    storing the received messages in the receiving device, relaying the received messages from the receiving device, or both; and determining from the number of messages received from the RFID device that are stored or that are relayed, or both, whether the closable container has or has not been opened and/or tampered with, whereby a container having an RFID device therein is monitored for being opened and/or tampered with.

19. The method of claim 18 further comprising:

sensing a thing and/or a condition at or proximate the RFID device, and transmitting data produced by said sensing in a message transmitted by the RFID device, or storing data produced by said sensing in the RFID device, or both.

20. The method of claim 19 wherein said transmitting data produced by said sensing comprises transmitting at a present time, or at a future time, or at a predetermined time, or periodically, or in response to an interrogation signal, or at a programmable power level, or any combination of the foregoing.

21. The method of claim 19 wherein the thing and/or condition sensed by said sensing includes an environmental condition, or temperature, or pressure, or position, or location, or motion, or acceleration, or impact, or distance, or inertial information, or magnetic field, or electrical continuity, or altitude, or a physical parameter, or moisture, or humidity, or a chemical, or a medical parameter, or a biological substance and/or agent, or radioactivity, or optical, or light, or infrared, or an image, or an electromagnetic field, or any combination of the foregoing.

22. The method of claim 18:

wherein said periodically transmitting messages comprises periodically transmitting at least two messages at different respective power levels from the RFID device interior to a closable container, wherein each of the at least two messages includes information uniquely identifying the RFID device and information representing the power level at which the message is transmitted; and wherein said determining from the number of messages received comprises determining from the number of messages received from the RFID device that are stored or that are relayed, or both, and from the power level thereof, whether the closable container has or has not been opened.

23. The method of claim 18 wherein:

said periodically transmitting messages comprises periodically transmitting messages from each of two RFID devices at different locations interior to the closable container; and wherein:

said receiving messages transmitted by the RFID device comprises receiving messages transmitted by the two RFID devices via two receiving devices at different locations exterior the closable container; said method further comprising:

determining from the number of messages transmitted by the first and second RFID devices that are received by each of the first and second receiving devices whether the closable container has or has not been opened.

24. The method of claim 18 wherein said relaying comprises:

relaying the received ones of the messages transmitted periodically by the RFID device, wherein at least some of the substantially attenuated messages are not received; and processing the relayed messages for monitoring the RFID device, said processing comprising:

determining the location of the RFID device from the relayed messages, or determining from the number of relayed messages from the RFID device whether the closable container has or has not been opened, or both of the foregoing.

25. The method of claim 24 wherein said determining the location of the RFID device from the relayed messages comprises:

defining a radius value representative of the power level of each relayed message; and for each RFID device, determining the intersection of respective geometric shapes having the defined radius values for locating that particular RFID device in the intersection.

26. The method of claim 18 further comprising relating an object RFID device associated with an object to a given closable container by a predetermined relationship, and storing in a database information relating the RFID device interior the given closable container and the object RFID device related thereto.

27. The method of claim 26 wherein the predetermined relationship includes proximity of the object and the given closable container, or absence of proximity of the object and the given closable container, or both, and further comprising providing an indication of whether the object and the given closable container are in the predetermined relationship.

28. The method of claim 26 wherein the object includes a carrier carrying the given closable container, or a vehicle carrying the given closable container, or a driver or operator of a carrier carrying the given closable container, or a driver or operator of a vehicle carrying the given closable container, or an inspector of the given closable container, or a maintenance or service worker for the given closable container, or a person not authorized to be proximate the given closable container, or any combination of the foregoing.

29. A method for monitoring a container having at least one RFID device interior thereto, said method comprising:

providing an RFID device interior to a container, the RFID device periodically transmitting messages;

wherein each of the messages includes information uniquely identifying the RFID device, and wherein ones of the messages that are transmitted when the container is closed are substantially attenuated by the container, and wherein ones of the messages that are transmitted when an opening in the container is open are not substantially attenuated by the container;

receiving messages transmitted by the RFID device interior the container by a receiving device exterior the container;

whereby ones of the messages that are transmitted when the container is closed are substantially attenuated and/or are not received by the receiving device, and wherein ones of the messages that are transmitted when the container is tampered with and/or when the opening of the container is open are received by the receiving device; and determining from the messages received from the RFID device whether the opening of the container has or has not been opened and/or the container has been tampered with, whereby a container having an RFID device therein is monitored for being opened and/or tampered with.

30. A method for monitoring one or more objects each having an RFID device associated therewith, said method comprising:

transmitting at least two messages from the RFID device, wherein each of the at least two messages includes information uniquely identifying the RFID device and information representing the power level at which the message is transmitted;
relaying the at least two messages transmitted by each RFID device to a processor; and
processing the relayed messages for determining the location of each REID device, said processing comprising:
processing the unique identifying information and the power level information from each relayed message for associating the relayed messages from each REID device and the power level thereof, and
determining from the relayed messages from a particular RFID device the location of that particular RFID device and its associated object.

31. The method of claim 30 wherein said relaying further comprises associating identification information, or location information, or date/time information, or any combination of the foregoing, with the messages relayed; and
wherein said processing the relayed messages may or may not include processing the identification information, or the location information, or the date/time information, or any combination of the foregoing, for determining the location of a particular REID device.

32. The method of claim 30 wherein said transmitting at least two messages comprises transmitting continuously, or transmitting messages periodically at regular or irregular intervals of time, or transmitting messages at programmable intervals, or transmitting messages at programmable power levels, or transmitting messages responsive to an interrogation signal, or transmitting messages until receipt of an acknowledgment signal, or any combination of the foregoing.

33. The method of claim 30 wherein said determining from the relayed messages further comprises:
defining a radius value representative of the power level of each relayed message;
for each REID device, determining respective geometric shapes having the defined radius values;
for each REID device, if the respective geometric shapes having the defined radius values do not intersect, then proportionately increasing the radius values thereof until the respective geometric shapes do intersect; and
for each REID device, determining the intersection of respective geometric shapes having the defined radius values for locating that particular REID device in the intersection.

34. The method of claim 30 wherein said processing the relayed messages comprises storing in records in a database at least the information contained in the relayed messages and the location information determined for each RFID device from which a relayed message has been received, said method further comprising:
accessing information stored in records of the database via wire, or cable, or telephone, or a radio link, or a network, or the Internet, or an intranet, or a local area network, or a wide area network, or a wireless network, or an ad hoc network, or a satellite, or e-mail, or a computer, or a laptop computer, or a personal digital assistant device, or a Blackberry-enabled device, or a Wi-Fi-enabled device, or a cell phone, or a WAP-enabled cell phone, or a pager, or any combination of the foregoing.

35. A method for monitoring an object having at least one REID device interior thereto, said method comprising:
periodically transmitting at least two messages from at least one REID device interior to a closable object;
wherein each of the at least two messages includes information uniquely identifying the REID device and information representing the power level at which the message is transmitted, and
wherein ones of the periodic messages that are transmitted when the closable object is closed are substantially attenuated by the closable object, and wherein ones of the periodic messages that are transmitted when the closable object is not closed are not substantially attenuated by the closable object;
relaying received ones of the at least two messages transmitted periodically by each REID device via at least one relay device exterior the closable object; and
processing the relayed messages for determining the location of each RFID device, said processing comprising:
processing the unique identifying information and the power level information from each relayed message for associating the messages from each RFID device and the power level thereof, and
determining from the messages from a particular RFID device the location of that particular RFID device,
whereby a particular RFID device and its associated object are monitored.

36. The method of claim 35:
wherein said relaying further comprises associating identification information, or location information, or date/time information, or any combination of the foregoing, with the messages relayed; and
wherein said processing the relayed messages further includes processing the identification information, or the location information, or the date/time information, or any combination of the foregoing, for determining the location of a particular RFID device.

37. The method of claim 35 wherein said processing the relayed messages further comprises storing in records in a database at least the information contained in the relayed messages and the location information determined for each RFID device from which a relayed message has been received, and further comprising:
locating each RFID device from information contained in the most recent record for that RFID device that is stored in the database; or
tracking each RFID device from information contained in accumulated records for that RFID device that are stored in the database; or
monitoring each RFID device from information contained in at least selected ones of the records for that REID device that are stored in the database; or
providing an indication of an opening of an object associated with an REID device from information contained in the record or records for that RFID device that are stored in the database; or
any combination of the foregoing.

38. The method of claim 37 further comprising, in addition to providing a given RFID device interior a given closable object, relating a second object RFID device associated with a second object to the given closable object by a predetermined relationship, and storing in the database information relating the given RFID device interior the given closable object and the second object RFID device related thereto.

39. The method of claim 35 wherein the unique identifying information of the RFID device includes a set of a plurality of unique identifiers, one of which unique identifiers is presently included in messages for uniquely identifying the REID device, said method further comprising:
permanently and irreversibly replacing the presently utilized one of the set of unique identifiers by another unique identifier of the set of unique identifiers for thereafter uniquely identifying the RFID device, whereby the RFID device may be identified by the another unique identifier for reuse.

* * * * *